(12) United States Patent
Scofield et al.

(10) Patent No.: US 9,958,280 B2
(45) Date of Patent: May 1, 2018

(54) ASSESSING INTER-MODAL PASSENGER TRAVEL OPTIONS

(75) Inventors: Christopher L. Scofield, Seattle, WA (US); Kush G. Parikh, Kirkland, WA (US); William J. Schwebel, Seattle, WA (US)

(73) Assignee: INRIX, INC., Kirkland, WA (US)

( * ) Notice: Subject to any disclaimer, the term of this patent is extended or adjusted under 35 U.S.C. 154(b) by 1094 days.

(21) Appl. No.: 13/587,798

(22) Filed: Aug. 16, 2012

(65) Prior Publication Data

US 2013/0046456 A1 Feb. 21, 2013

Related U.S. Application Data

(60) Provisional application No. 61/524,199, filed on Aug. 16, 2011.

(51) Int. Cl.
*G01C 21/34* (2006.01)
*G08G 1/0968* (2006.01)

(52) U.S. Cl.
CPC ..... *G01C 21/3423* (2013.01); *G01C 21/3453* (2013.01); *G08G 1/096838* (2013.01)

(58) Field of Classification Search
CPC .......................... G01C 21/3423; G01C 21/3453
USPC ......................................................... 701/400
See application file for complete search history.

(56) References Cited

U.S. PATENT DOCUMENTS

| | | | |
|---|---|---|---|
| 3,582,620 A | 6/1971 | Noetinger | 235/150.24 |
| 3,626,413 A | 12/1971 | Zachmann | 343/8 |
| 4,866,438 A | 9/1989 | Knisch | 340/936 |
| 4,985,705 A | 1/1991 | Stammler | 342/69 |

(Continued)

FOREIGN PATENT DOCUMENTS

| | | |
|---|---|---|
| DE | 10063763 | 7/2002 |
| DE | 102004015880 | 11/2004 |

(Continued)

OTHER PUBLICATIONS

"Dash Express Automotive Navigation System," retrieved Aug. 3, 2007, from http://www.dash.net/product.php, 1 page.

(Continued)

*Primary Examiner* — Lail A Kleinman
(74) *Attorney, Agent, or Firm* — Cooper Legal Group, LLC

(57) ABSTRACT

Techniques are described for using information regarding road traffic and other types of transportation-related information to determine and/or assess alternative inter-modal passenger travel options in a geographic area that supports multiple modes of transportation. For example, a particular user may have multiple alternatives for travel from a starting location to a destination location in the geographic area, including to use alternative modes of transportation (e.g., private vehicle, bus, train, walking, etc.) for some or all of the travel, and these alternatives may have different travel-related characteristics in different situations (e.g., depending on current road traffic; mass transit schedules and current actual deviations; travel-related fees for gas, parking, mass transit, etc; parking availability; etc.). Multiple alternative travel options are thus assessed for a given situation based on multiple types of information, enabling one or more preferred travel options for the given situation to be identified and used.

42 Claims, 6 Drawing Sheets

(56) References Cited

U.S. PATENT DOCUMENTS

| | | | |
|---|---|---|---|
| 5,289,183 A | 2/1994 | Hassett et al. | 340/905 |
| 5,337,082 A | 8/1994 | Fredericks | 342/69 |
| 5,465,289 A | 11/1995 | Kennedy, Jr. | 379/59 |
| 5,610,821 A | 3/1997 | Gazis et al. | 364/444.2 |
| 5,663,720 A | 9/1997 | Weissman | 340/934 |
| 5,673,039 A | 9/1997 | Pietzsch et al. | 340/905 |
| 5,696,502 A | 12/1997 | Busch et al. | 340/905 |
| 5,745,865 A | 4/1998 | Rostoker et al. | 701/117 |
| 5,801,943 A | 9/1998 | Nasburg | 364/436 |
| 5,827,712 A | 10/1998 | Yokoyama et al. | 435/193 |
| 6,011,515 A | 1/2000 | Radcliffe et al. | 342/453 |
| 6,119,013 A | 9/2000 | Maloney et al. | 455/456 |
| 6,150,961 A | 11/2000 | Alewine et al. | 340/995 |
| 6,292,742 B1 | 9/2001 | Heimann et al. | 707/117 |
| 6,317,686 B1 | 11/2001 | Ran | 701/201 |
| 6,401,027 B1 | 6/2002 | Xu et al. | 701/117 |
| 6,463,382 B1 | 10/2002 | Bullock | 701/117 |
| 6,480,783 B1 | 11/2002 | Myr | 701/117 |
| 6,490,519 B1 | 12/2002 | Lapidot et al. | 701/117 |
| 6,496,773 B1 | 12/2002 | Olsson | 701/117 |
| 6,505,114 B2 | 1/2003 | Luciani | 701/117 |
| 6,574,548 B2 | 6/2003 | DeKock et al. | 701/117 |
| 6,594,576 B2 | 7/2003 | Fan et al. | 701/117 |
| 6,650,948 B1 | 11/2003 | Atkinson et al. | 700/66 |
| 6,664,922 B1 | 12/2003 | Fan | 342/357.1 |
| 6,728,628 B2 | 4/2004 | Peterson | 701/117 |
| 6,781,523 B2 | 8/2004 | Matsui et al. | 340/910 |
| 6,832,140 B2 | 12/2004 | Fan et al. | 701/33 |
| 6,862,524 B1 | 3/2005 | Nagda et al. | 701/209 |
| 6,882,313 B1 | 4/2005 | Fan et al. | 342/457 |
| 6,922,566 B2 | 7/2005 | Puranik et al. | 455/456.2 |
| 6,973,319 B2 | 12/2005 | Ormson | 455/456.1 |
| 7,026,958 B2 | 4/2006 | Wainfan et al. | 340/995.13 |
| 7,027,915 B2 | 4/2006 | Craine | 701/117 |
| 6,989,765 B2 | 6/2006 | Gueziec | 340/905 |
| 7,069,143 B2 | 6/2006 | Peterson | 701/117 |
| 7,096,115 B1 | 8/2006 | Groth et al. | 701/117 |
| 7,116,326 B2 | 10/2006 | Soulchin et al. | 345/440 |
| 7,161,497 B2 | 1/2007 | Gueziec | 340/905 |
| 7,221,287 B2 | 5/2007 | Gueziec et al. | 340/905 |
| 7,375,649 B2 | 5/2008 | Gueziec | 340/905 |
| 7,508,321 B2 | 3/2009 | Gueziec et al. | 340/905 |
| 7,519,564 B2 | 4/2009 | Horvitz | 706/12 |
| 7,557,730 B2 | 7/2009 | Gueziec | 340/905 |
| 7,609,176 B2 | 10/2009 | Yamane et al. | 340/904 |
| 7,610,145 B2 | 10/2009 | Kantarjiev et al. | 701/204 |
| 7,899,611 B2 | 3/2011 | Downs et al. | 701/117 |
| 2001/0025222 A1* | 9/2001 | Bechtolsheim et al. | 701/209 |
| 2001/0047241 A1 | 11/2001 | Khavakh et al. | 701/209 |
| 2002/0051464 A1 | 5/2002 | Sin et al. | 370/62 |
| 2003/0028319 A1 | 2/2003 | Khavakh et al. | 701/209 |
| 2003/0069683 A1 | 4/2003 | Lapidot et al. | 701/117 |
| 2003/0109266 A1* | 6/2003 | Rafiah et al. | 455/456 |
| 2003/0135304 A1 | 7/2003 | Sroub et al. | 701/1 |
| 2004/0039520 A1 | 2/2004 | Khavakh et al. | 701/201 |
| 2004/0249568 A1 | 12/2004 | Endo et al. | 701/209 |
| 2004/0267440 A1 | 12/2004 | DeKock et al. | 701/117 |
| 2005/0096839 A1 | 5/2005 | Nakano et al. | 701/200 |
| 2006/0041927 A1 | 2/2006 | Stark et al. | 725/139 |
| 2006/0074551 A1 | 4/2006 | Zaitsu et al. | 701/209 |
| 2006/0103674 A1 | 5/2006 | Horvitz et al. | 345/629 |
| 2006/0106530 A1 | 5/2006 | Horvitz et al. | 701/117 |
| 2006/0106599 A1 | 5/2006 | Horvitz | 704/219 |
| 2006/0106743 A1 | 5/2006 | Horvitz | 706/21 |
| 2006/0122846 A1 | 6/2006 | Burr et al. | 705/1 |
| 2006/0149461 A1 | 7/2006 | Rowley et al. | 701/202 |
| 2006/0155464 A1 | 7/2006 | Smartt | 701/208 |
| 2006/0224797 A1 | 10/2006 | Parish et al. | 710/62 |
| 2006/0229802 A1 | 10/2006 | Vertelney et al. | 701/200 |
| 2007/0005419 A1 | 1/2007 | Horvitz et al. | 705/14 |
| 2007/0073477 A1 | 3/2007 | Krumm et al. | 701/209 |
| 2007/0199050 A1 | 8/2007 | Meier | 726/4 |
| 2007/0208492 A1 | 9/2007 | Downs et al. | 701/117 |
| 2007/0208494 A1 | 9/2007 | Chapman et al. | 701/117 |
| 2007/0208495 A1 | 9/2007 | Chapman et al. | 701/117 |
| 2007/0208496 A1 | 9/2007 | Downs et al. | 701/117 |
| 2007/0208497 A1 | 9/2007 | Downs et al. | 701/117 |
| 2007/0208498 A1 | 9/2007 | Barker et al. | 701/117 |
| 2007/0208501 A1 | 9/2007 | Downs et al. | 709/119 |
| 2008/0046165 A1 | 2/2008 | Downs et al. | 701/117 |
| 2008/0059115 A1 | 3/2008 | Wilkinson | 702/179 |
| 2008/0071465 A1 | 3/2008 | Chapman et al. | 701/117 |
| 2008/0071466 A1 | 3/2008 | Downs et al. | 701/117 |
| 2008/0021791 A1 | 6/2008 | Steelberg et al. | 705/26 |
| 2008/0133517 A1 | 6/2008 | Kapoor et al. | 707/6 |
| 2008/0275309 A1 | 11/2008 | Stivoric et al. | 600/300 |
| 2008/0278328 A1 | 11/2008 | Chand et al. | 340/572.1 |
| 2009/0118996 A1 | 5/2009 | Kantarjiev et al. | 701/119 |
| 2009/0157298 A1* | 6/2009 | Kon et al. | 701/201 |

FOREIGN PATENT DOCUMENTS

| | | |
|---|---|---|
| JP | 11-316126 A | 11/1999 |
| JP | 2001-227977 A | 8/2001 |
| JP | 2003-151079 A | 5/2003 |
| JP | 2004-347448 A | 12/2004 |
| JP | 2006-17607 A | 1/2006 |
| JP | 2006090872 | 4/2006 |
| WO | 2004/021305 | 3/2004 |
| WO | 2004/021306 | 3/2004 |
| WO | 2006/005906 | 1/2006 |

OTHER PUBLICATIONS

"Dash Navigation Unveils First Internet-Connected Auto Navigation Device," Sep. 26, 2006, Dash Navigation™, Inc., retrieved Aug. 3, 2007, from http://www.dash.net/news_pr-060925.php, 1 page.

"Inrix Advances Navigation with 'Nationwide Average Speeds'," Aug. 7, 2006, Inrix, Inc., retrieved Jul. 19, 2007, from http://www.inrix.com/news_NationwideAverageSpeeds_07Aug2006.asp, 1 page.

"Inrix Historical Traffic Improves Consumer Navigation Experience," Jul. 18, 2007, Inrix, Inc., retrieved Jul. 19, 2007, from http://www.inrix.com/news_NAS_18July2007.asp, 2 pages.

"LandSonar, Inc. Announces First-Ever Nationwide Traffic-Prediction Product," Jan. 22, 2006, LandSonar, Inc., retrieved Jul. 20, 2007, from http://www.landsonar.com/?p=55, 3 pages.

"NAVTEQ Launches NAVTEQ Traffic Patterns™ Database: *Historic Traffic Data is the Basis for Predicting Traffic Behavior and Enhancing Routes*," Jan. 5, 2007, NAVTEQ, retrieved Jul. 19, 2007, from http://www.navteq.com/webapps/NewsUserServlet?action=NewsDetail&newsId=479, 2 pages.

"TrafficCast International and LandSonar Introduce LPS Plus," Mar. 1, 2007, LandSonar, Inc., retrieved Jul. 19, 2007, from http://www.landsonar.com/?p=117, 2 pages.

"About LandSonar, Inc.," retrieved Apr. 27, 2006, from http://www.landsonar.com/?page_id=2, 2 pages.

"Award Abstract—#0349460—SBIR Phase II: Animated Real-Time Road Traffic Visualization for Broadcast and the Internet," National Science Foundation, retrieved Jul. 31, 2006, from http://www.nsf.gov/awardsearch/showAward.do?AwardNumber=0349460, 2 pages.

"Global Positioning Systems > Tracking Systems in the Yahoo! Directory," Yahoo!® Small Business Directory, retrieved Feb. 8, 2006, from http://dir.yahoo.com/Business_and_Economy/Business_to_Business/Navigation/Global_Positioning_Systems/Tracking_Systems, 8 pages.

"Powerful Tool Crunches Commutes," Mar. 8, 2005, National Science Foundation, retrieved Jan. 20, 2006, from http://www.beatthetraffic.com/aboutus/nsf20050308.htm, 2 pages.

"Seattle Area Traffic—Central Puget Sound Travel Times," Washington State Department of Transportation, retrieved Jan. 20, 2006, from http://www.wsdot.wa.gov/traffic/seattle/traveltimes/, 3 pages.

"Technology Overview," retrieved Apr. 27, 2006, from http://www.landsonar.com/?page_id=20, 3 pages.

BeatTheTraffic.com: The Right Traffic at the Right Time™, Homepage, retrieved Jan. 20, 2006, from http://www.beatthetraffic.com/, 1 page.

(56) References Cited

OTHER PUBLICATIONS

Graham-Rowe, D., "Smart Traffic Forecast Offers Seven-Day Predictions," Jun. 29, 2005, NewScientist.com, retrieved Jan. 20, 2006, from http://www.newscientist.com/article.ns?id=dn7605&print=true, 2 pages.

Green, D., "Navigating by Phone," Apr. 28, 2004, Palo Alto Weekly Online Edition, retrieved Jul. 27, 2006, from http://www.paloaltoonline.com/weekly/morgue/2004/2004_04_28.zipdash28ja.shtml, 3 pages.

Slawski, W., "Ending Gridlock with Google Driving Assistance (Zipdash Re-Emerges)," Jul. 6, 2006, retrieved Jul. 27, 2006, from http://www.seobythesea.com/?p=240, 3 pages.

Smith, B. "OmniTRACS Keeps on Trucking," Dec. 1, 2005, WirelessWeek.com, retrieved Feb. 7, 2006, from http://www.wirelessweek.com/index.asp?layout=articlePrint&articleID=CA6287997, 2 pages.

Utter, D., "Google Mobilizes Traffic Data," Jul. 25, 2006, webpronews.com, retrieved Jul. 27, 2006, from http://www.webpronews.com/topnews/topnews/wpn-60-20060725GoogleMobilizesTrafficData.html, 3 pages.

U.S. Appl. No. 60/628,267, filed Nov. 16, 2004, Horvitz.

\* cited by examiner

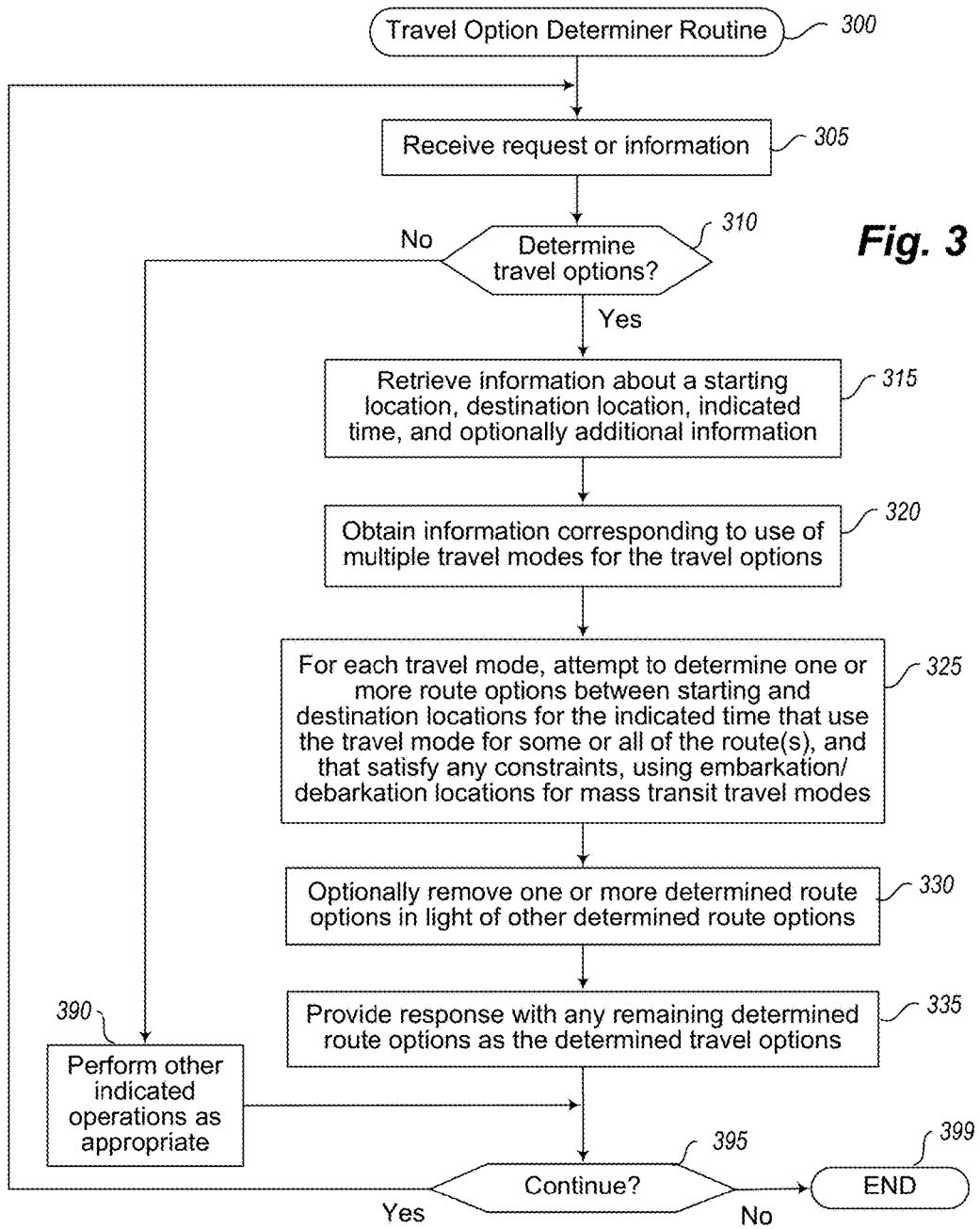

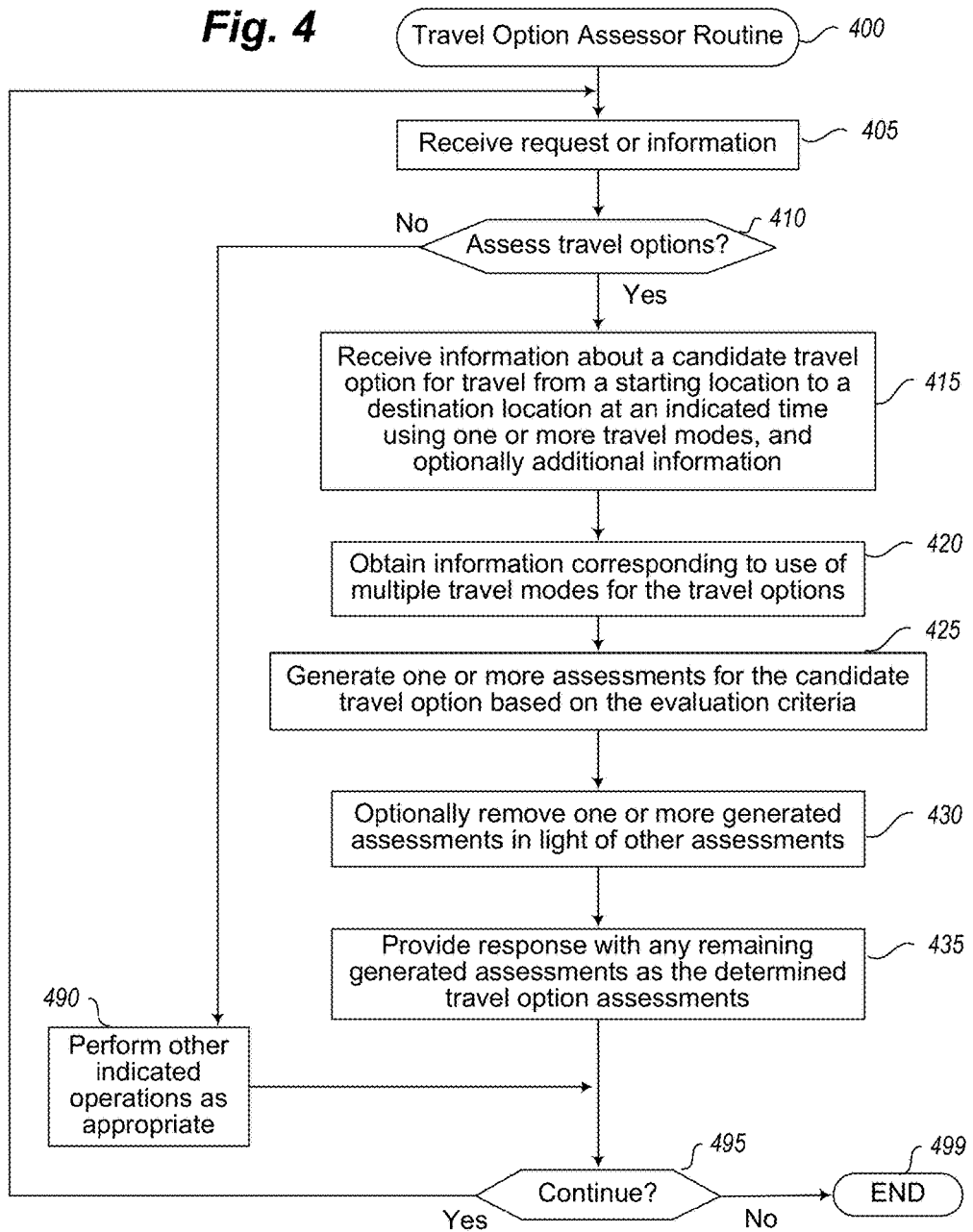

ASSESSING INTER-MODAL PASSENGER TRAVEL OPTIONS

CROSS-REFERENCE TO RELATED APPLICATIONS

This application claims the benefit of U.S. Provisional Patent Application No. 61/524,199, filed Aug. 16, 2011 and entitled "Assessing Inter-Modal Passenger Travel Options," which is hereby incorporated by reference in its entirety.

TECHNICAL FIELD

The following disclosure relates generally to techniques for assessing inter-modal passenger travel options based on multiple types of information, such as for commuter passengers who have multiple alternative travel options for a trip within a region that use multiple modes of passenger transportation.

BACKGROUND

Increasing road traffic and corresponding congestion has various negative effects. Accordingly, efforts have been made to combat increasing traffic congestion in various ways, such as by making information about current traffic conditions available. Such current traffic information may be provided to interested parties in various ways (e.g., via radio broadcasts, an Internet Web site that displays a map of a geographical area with color-coded information about current traffic congestion on some major roads in the geographical area, information sent to cellular telephones and other portable consumer devices, etc.). One source for information about current traffic conditions includes observations manually supplied by humans (e.g., traffic helicopters that provide general information about traffic flow and accidents, reports called in by drivers via cell phones, etc.), while another source in some larger metropolitan areas is networks of traffic sensors capable of measuring traffic flow for various roads in the area (e.g., via sensors embedded in the road pavement). Unfortunately, various problems exist with respect to such information, such as related to the accuracy and coverage of the information, as well as to similar information provided by other sources.

One use of road traffic information is for commuters and other passengers in areas having multiple alternative types of transportation. However, various problems exist with attempting to plan and take trips that include transportation other than private vehicles on public roads.

BRIEF DESCRIPTION OF THE DRAWINGS

FIG. 3 is an example flow diagram of an illustrated embodiment of a Travel Option Determiner routine.

FIG. 4 is an example flow diagram of an illustrated embodiment of a Travel Option Assessor routine.

DETAILED DESCRIPTION

Figure 1:
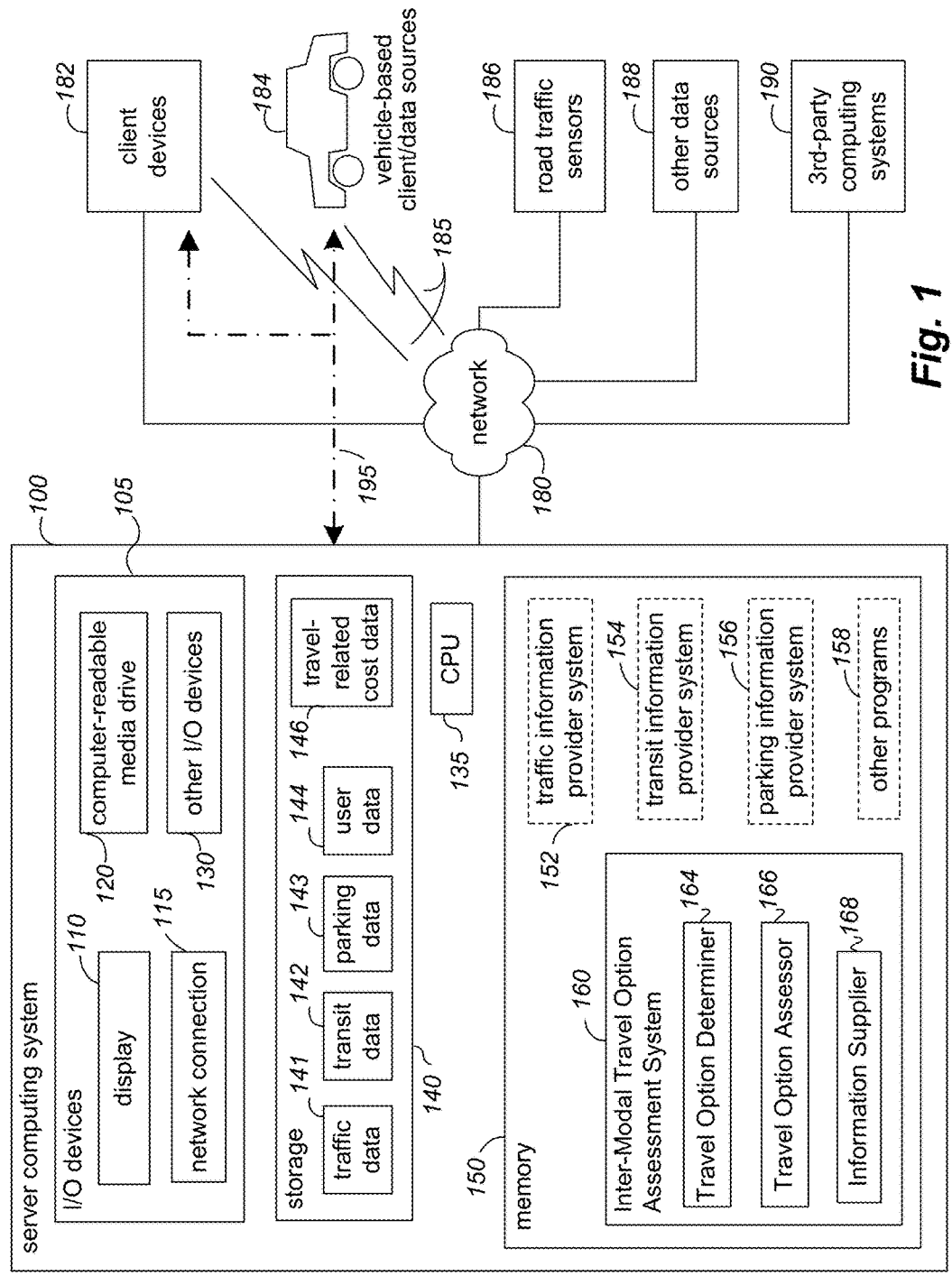
FIG. 1 is a block diagram illustrating a computing system suitable for executing embodiments of the described Inter-Modal Travel Option Assessment system.

Techniques are described for using information regarding road traffic and other types of transportation-related information in various ways, including in some embodiments to determine and/or assess alternative inter-modal passenger travel options in a geographic area that supports multiple modes of transportation. For example, a particular user may have multiple alternatives for a trip that involves traveling from a starting point location (e.g., his or her home) to a destination location (e.g., his or her place of employment or school) in the geographic area, including to use alternative modes of transportation (e.g., private vehicle, bus, train, walking, etc.) for some or all of the trip. In at least some situations, the multiple alternatives for such a trip include multiple alternative inter-modal travel options that together use different transportation modes for at least a segment of the travel, such as with a first travel option that uses a private vehicle driven by the user for the entire trip, with a second travel option that uses one or more buses for the at least the majority of the trip (e.g., after the user drives the private vehicle to a parking lot near a bus stop), and with a third travel option that uses commuter rail for at least the majority of the trip (e.g., after the user drives the private vehicle to a parking lot near a rail station). The multiple alternatives for such a trip may also have different travel-related characteristics at different times or otherwise in different situations—for example, depending on current road traffic, mass transit schedule, parking availability, travel-related fees, etc., the first travel option may in a first situation have a shorter time and/or lower cost relative to the second and third travel options, while the second or third travel options may instead have a shorter time and/or lower cost relative to the first travel option in a different second situation. Accordingly, in at least some embodiments, multiple such alternative travel options for a trip are assessed for a given situation based on multiple types of information, such as to enable one or more preferred travel options for the given situation to be identified and used in various manners. Additional details related to determining and/or assessing alternative inter-modal passenger travel options in particular manners are described below, and some or all of the described techniques are automatically performed in at least some embodiments by an automated Inter-Modal Travel Option Assessment ("IM-TOA") system.

The determining and/or assessing of alternative inter-modal passenger travel options may be performed in various manners in various embodiments. For example, various types of transportation modes may be considered in particular embodiments and situations, including using one or more of the following non-exclusive transportation modes for a particular travel option: a private motorized vehicle (e.g., a car, truck, motorcycle, etc.), a bus, a subway or other type of train (e.g., light rail, heavy rail, street car, trolley, etc.), walking, a bicycle, a ferry, a vanpool or other type of carpool, a motorized personal transporter that does not use public roads (e.g., a Segway transporter, a golf cart or similar vehicle, etc.), a shuttle provided between two or more specified locations, etc. In addition, various types of data may be obtained and used when assessing one or more travel options, including one or more of the following non-exclusive types of data: information about current and/or expected future road traffic conditions; information about the schedule for one or more transportation modes (e.g., a bus schedule for one or more bus routes, a train schedule for one or more train routes, a ferry schedule for one or more ferry routes, etc.) that are available for use; information about current and/or expected future variations for one or more transportation modes relative to their schedules; information about current and/or expected future parking availability at one or more locations corresponding to use of a particular transportation mode (e.g., a parking lot at or near a bus stop, train/rail station, terminal, etc.); information about current and/or expected future costs corresponding to some or all of a travel option (e.g., parking costs, costs to use a particular mass transit option, tolls, costs to operate a particular personal vehicle type, etc.); information about current and/or expected future weather; etc. The expected future information of one or more particular types may be obtained in various manners in various embodiments, such as by using information that is automatically predicted (e.g., based at least in part on current and/or historical information) by an appropriate automated system. In a similar manner, the current information of a particular type may be obtained in various manners in various embodiments, such as by obtaining data in a real-time or near-real-time manner from one or more data sources or automated data systems, by predicting current data (e.g., at a previous time, or at the current time based on other available data), etc. Additional details are included below related to assessing particular travel options for a particular trip. In addition, in some situations a trip with such travel options may be a repeated trip that occurs multiple times (e.g., with different travel options at different times or otherwise in different situations; with different travel-related characteristics at different times or otherwise in different situations, such as for an unchanging or changing set of travel options; etc.), while in other situations such a trip may be a one-time trip that is not expected to be repeated.

Before discussing some details of the described techniques performed by embodiments of the IMTOA system, some aspects are introduced regarding road traffic information that may be available for use by the IMTOA system in at least some embodiments. In particular, such available road traffic information may have various forms. For example, in some embodiments, available road traffic information may include historical traffic data that reflects information about traffic for various target roads of interest in a geographical area, such as for a network of roads in the geographic area. In addition, in some embodiments, the available road traffic information may include current traffic data and/or automatically determined predicted future traffic data. Furthermore, various road traffic information may be obtained in various manners, such as from stationary road traffic sensors (e.g., data readings from a physical sensor that is near to or embedded in a road, such as to report aggregate data for large numbers of vehicles corresponding to a particular road location) and/or from mobile data sources (e.g., a series of data samples that are obtained from a vehicle or other mobile data source that is currently or recently engaged in a trip over particular roads, such as with each data sample including an associated road location and time). Moreover, such data readings and data samples may be filtered, conditioned and/or aggregated in various ways before further use.

In addition, road traffic information may be tracked and/or determined for various measures of traffic conditions in various embodiments, such as one or more of the following: average speed, a volume or frequency of traffic for an indicated period of time (e.g., to indicate a total number of vehicles during that time period), an average occupancy time of one or more traffic sensors or other locations on a road (e.g., to indicate the average percentage of time that a vehicle is over or otherwise activating a sensor), one of multiple enumerated levels of road congestion (e.g., measured based on one or more other traffic conditions measures), etc. Such road traffic information may also be tracked and/or determined for each of multiple road locations (e.g., road segments, road map links, particular points on roads, etc.) or other portions of roads during each of multiple time periods, and values for each such traffic conditions measure may be represented at varying levels of precision in varying embodiments. For example, values for an average speed conditions measure may be represented at the nearest 1-MPH ("mile per hour") increment, the nearest 5-MPH increment, in 5-MPH buckets (e.g., 0-5 MPH, 6-10 MPH, 11-15 MPH, etc.), in other defined buckets of constant or varying size, in fractions of 1-MPH increments at varying degrees of precision, etc. Such traffic conditions measures may also be measured and represented in absolute terms and/or in relative terms (e.g., to represent a difference from typical or from maximum).

In some embodiments, one or more roads in a given geographic region may be modeled or represented by the use of road links. Each road link may be used to represent a portion of a road, such as by dividing a given physical road into multiple road links. For example, each link might be a particular length, such as a one-mile length of the road or 200-foot length of the road, or instead some such links may correspond to particular road features (e.g., to represent an intersection or other junction of multiple roads with a particular road link). Such road links may be defined, for example, by governmental or private bodies that create maps (e.g., by a government standard; by commercial map companies as a quasi-standard or de facto standard; etc.) and/or by a provider of the IMTOA system, such that a given road may be represented with different road links by different entities. It will also be appreciated that roads may be interconnected in various manners, including to allow traffic to diverge or converge at various locations (e.g., to diverge at highway off-ramps; at forks or splits in a road; at other junctions of two or more highways or roads, including an interchange or an intersection that may or may not be controlled by signals, signs, road features such as traffic circles and roundabouts, etc.; at a driveway or other turn from a road; etc., and to converge at highway on-ramps; at merges or joins of multiple roads; at other, junctions of two or more highways or roads, including an interchange or an intersection that may or may not be controlled by signals, signs, road features such as traffic circles and roundabouts, etc.; at a driveway or other turn onto a road; etc.). In addition, in some embodiments, one or more roads in a given geographic region may also be modeled or represented by the use of road segments, such as road segments defined by a provider of the IMTOA system (e.g., manually and/or in an automated manner). Each road segment may be used to represent a portion of a road (or of multiple roads) that has similar traffic condition characteristics for one or more road links (or portions thereof) that are part of the road segment. Thus, a given physical road may be divided into multiple road segments, such as multiple road segments that correspond to successive portions of the road, or alternatively in some embodiments by having overlapping or have intervening road portions that are not part of any road segment, and with some such road segments optionally corresponding to particular road features (e.g., to represent an intersection or other junction of multiple roads with a particular road link). In addition, each road segment may be selected so as to include some or all of one or more road links. Furthermore, a road segment may represent one or more lanes of travel on a given physical road. Accordingly, a particular multi-lane road that has one or more lanes for travel in each of two directions may be associated with at least two road segments, with at least one road segment associated with travel in one direction and with at least one other road segment associated with travel in the other direction. Similarly, if a road link represents a multi-lane road that has one or more lanes for travel in each of two directions, at least two road segments may be associated with the road link to represent the different directions of travel. In addition, multiple lanes of a road for travel in a single direction may be represented by multiple road segments in some situations, such as if the lanes have differing travel condition characteristics. For example, a given freeway system may have express or high occupancy vehicle ("HOV") lanes that may be beneficial to represent by way of road segments distinct from road segments representing the regular (e.g., non-HOV) lanes traveling in the same direction as the express or HOV lanes. Road segments may further be connected to or otherwise associated with other adjacent road segments, thereby forming a chain or network of road segments.

The roads for which road traffic information is tracked and/or determined may be selected in various manners in various embodiments. In some embodiments, traffic information is tracked and/or determined for each of multiple geographic areas (e.g., metropolitan areas), with each geographic area having a network of multiple inter-connected roads. Such geographic areas may be selected in various ways, such as based on areas in which traffic data is readily available (e.g., based on networks of road sensors for at least some of the roads in the area), in which particular other types of transportation modes are available, in which traffic congestion is a significant problem, and/or in which a high volume of road traffic occurs during at least some times. In some such embodiments, the roads for which traffic information is tracked and/or determined may be based at least in part on one or more other factors (e.g., based on size or capacity of the roads, such as to include freeways and major highways; based on the role the roads play in carrying traffic, such as to include arterial roads and collector roads that are primary alternatives to larger capacity roads such as freeways and major highways; based on functional class of the roads, such as is designated by the Federal Highway Administration; based on popularity of the roads in carrying traffic, such as to reflect actual driver behavior; etc.), or instead information may be tracked and/or determined for all roads. In addition, in some embodiments, traffic information is tracked and/or determined for some or all roads in one or more large regions, such as each of one or more states or countries (e.g., to generate nationwide data for the United States and/or for other countries or regions). In some such embodiments, all roads of one or more functional classes in the region may be covered, such as to include all interstate freeways, all freeways and highways, all freeways and highways and major arterials, all local and/or collector roads, all roads, etc. Thus, a variety of types of traffic information may be tracked and/or determined in various embodiments, and may be used by particular embodiments of the IMTOA system in various manners.

As noted above, particular user behavior may be influenced or otherwise affected in different manners under different conditions and/or other factors, including at different times and/or based on other conditions that affect traffic. Accordingly, in at least some embodiments, traffic information for a particular road link or other portion of road is tracked and/or determined for each of one or more traffic conditions aggregation categories, such as for some or all road links or other road portions. In particular, in at least some embodiments, various time-based categories are used, and traffic information is separately tracked and/or determined for each of the time-based categories. As one example, time periods may be based at least in part on information about day-of-week and/or time-of-day (e.g., hour-of-day, minute-of-hour-of-day, etc.), such that each time-based category may correspond to one or more days-of-week and one or more times-of-day on those days-of-week. If, for example, each day-of-week and each hour-of-day are separately modeled with time-based categories, 168 (24*7) time-based categories may be used (e.g., with one category being Mondays from 9 am-9:59 am, another category being Mondays from 10 am-10:59 am, another category being Sundays from 9 am-9:59 am, etc.). In this example, traffic information for a road link and a particular time-based category, such as Mondays from 10 am-10:59 am, may be determined at least in part by aggregating historical traffic information that corresponds to that road link and category, such as for traffic conditions information reported for that road link on prior Mondays between 10 am and 10:59 am. Alternatively, a particular time-based category may include a grouping of multiple days-of-week and/or hours-of-day, such as if the grouped times are likely to have similar traffic conditions information (e.g., to group days of week and times of day corresponding to similar work commute-based times or non-commute-based times). A non-exclusive list of examples of day-of-week groupings include the following: (a) Monday-Thursday, Friday, and Saturday-Sunday; (b) Monday-Friday and Saturday-Sunday; (c) Monday-Thursday, Friday, Saturday, and Sunday; and (d) Monday-Friday, Saturday, and Sunday. A non-exclusive list of examples of time-of-day groupings include the following: (a) 6 am-8:59 am, 9 am-2:59 pm, 3 pm-8:59 pm, and 9 pm-5:59 am; and (b) 6 am-6:59 pm and 7 pm-5:59 am. Accordingly, one example group of time-based categories for which traffic information may be tracked and/or determined is as follows:

| Category | Day-Of-Week | Time-Of-Day |
| --- | --- | --- |
| 1 | Monday-Thursday | 6 am-8:59 am |
| 2 | Monday-Thursday | 9 am-2:59 pm |
| 3 | Monday-Thursday | 3 pm-8:59 pm |
| 4 | Monday-Thursday | 9 pm-5:59 am |
| 5 | Friday | 6 am-8:59 am |
| 6 | Friday | 9 am-2:59 pm |
| 7 | Friday | 3 pm-8:59 pm |
| 8 | Friday | 9 pm-5:59 am |
| 9 | Saturday-Sunday | 6 am-6:59 pm |
| 10 | Saturday-Sunday | 7 pm-5:59 am |

Furthermore, in some embodiments, time periods for time-based categories may be selected for time increments of less than an hour, such as for 15-minute, 5-minute, or 1-minute intervals. If, for example, each minute-of-day for each day-of-week is separately represented, 10,080 (60*24*7) time-based categories may be used (e.g., with one category being Mondays at 9:00 am, another category being Mondays at 9:01 am, another category being Sundays at 9:01 am, etc.). In such an embodiment, if sufficient historical data is available, traffic information may be determined for a particular road link and a particular time-based category using only historical traffic information that corresponds to that road link and the particular minute for the time-based category, while in other embodiments historical information for a larger time duration may be used. For example, for an example time-based category corresponding to Mondays at 9:01 am, historical information from a rolling time duration of one hour (or another time duration) surrounding that time may be used (e.g., on Mondays from 8:31 am-9:31 am, on Mondays from 8:01 am-9:01 am, on Mondays from 9:01 am-10:01 am, etc.). In other embodiments, periods of time may be defined based on other than time-of-day and dayof-week information, such as based on day-of-month, day-of-year, week-of-month, week-of-year, etc.

In addition, in at least some embodiments, the traffic conditions aggregation categories used for traffic information may be based on temporary or other variable conditions other than time that alter or otherwise affect traffic conditions, whether instead of or in addition to time-based categories. In particular, in at least some embodiments, various condition-based categories may be selected, and traffic information may be separately tracked and/or determined for each of the condition-based categories for one or more road links or other road portions. Each such condition-based category may be associated with one or more traffic-altering conditions of one or more types. For example, in some embodiments, traffic-altering conditions related to a particular road link or other road portion that are used for condition-based categories for that road link/portion may be based on one or more of the following: weather status (e.g., based on weather in a geographic area that includes the road link/portion); status regarding occurrence of a non-periodic event that affects travel on the road link/portion (e.g., based on an event with sufficient attendance to affect travel on the road link/portion, such as a major sporting event, concert, performance, etc.); status regarding a current season or other specified group of days during the year; status regarding occurrence of one or more types of holidays or related days; status regarding occurrence of a traffic accident that affects travel on the road link/portion (e.g., a current or recent traffic accident on the road link/portion or on nearby road links/portions); status regarding road work that affects travel on the road link/portion (e.g., current or recent road work on the road link/portion or on nearby road links/portions); and status regarding school sessions that affects travel on the road link/portion (e.g., a session for a particular nearby school, sessions for most or all schools in a geographic area that includes the road link/portion, etc.).

In a similar manner, in at least some embodiments, the aggregation categories used for road traffic information may be based on factors other than time or other variable non-time conditions, whether instead of or in addition to time-based categories and/or categories based on other variable non-time conditions. In particular, in at least some embodiments, various categories may be selected based on one or more factors that include one of multiple vehicle types (e.g., electric vehicles, hybrid vehicles, diesel-based vehicles, gasoline-based vehicles, bicycles, motorcycles, mass-transit vehicles, non-electric vehicles, non-hybrid vehicles, non-diesel-based vehicles, non-gasoline-based vehicles, non-bicycles, non-motorcycles, non-mass-transit vehicles, etc.) and/or one of multiple types of driver behaviors (e.g., prefer route with shortest time, prefer route with shortest distance, prefer route with lowest variability in speed if its average or other representative speed is within a specified percentage or amount of the average shortest time on another route, prefer scenic routes, prefer to avoid highways, prefer to avoid tolls, prefer to avoid ferries, prefer to avoid timed restrictions, prefer routes that have or that do not have one or more specified types of facilities along the route, etc.), and traffic information may be separately tracked and/or determined for each of the factor-based categories for one or more road links or other road portions.

Furthermore, the aggregation categories used for road traffic information may similarly be used in at least some embodiments to categorize other types of travel-related information as well, such as delays and other variations from scheduled activities (e.g., mass transit schedules), parking availability at particular locations, costs associated with particular travel modes, etc.

As noted above, embodiments of the IMTOA system may automatically determine and/or assess alternative inter-modal passenger travel options in particular manners, with different travel options having different travel characteristics at different times or otherwise in different situations. For example, travel times, costs and/or other travel-related characteristics may vary under different time-based conditions or other types of conditions. Similarly, the assessment of particular travel options may vary by other factors in some embodiments, such as different types of vehicles and/or different types of user preferences of vehicle drivers. Accordingly, in at least some embodiments, the IMTOA system may perform some or all of its automated determinations in manners that reflect such user-specific information and/or other types of time-based or other conditions, as discussed in greater detail below.

In addition, information that is automatically generated by embodiments of the IMTOA system may be used in various manners, including in some embodiments to provide information to users about particular preferred travel options that are determined by the IMTOA system, so as to affect immediate or future trips (e.g., by supplying the information directly to driver users, such as in response to a request from the user; by supplying the information to navigation systems or other automated systems that use the information to influence driver behavior; etc.).

For illustrative purposes, some embodiments are described below in which specific types of information is analyzed to provide particular types of traffic-related output in specific ways, including to determine particular preferred travel options in particular manners based at least in part on particular types of traffic-related information. However, it will be understood that such traffic-related output may be generated in other manners and using other types of input data in other embodiments, that the described techniques may be used in a wide variety of other situations, that other types of traffic-related information may similarly be generated and used in various ways, and that the invention is thus not limited to the exemplary details provided.

In at least some embodiments, the IMTOA system automatically determines, assesses and/or provide various types of trip-related information, including information about multiple alternative inter-modal passenger travel options for a trip, so as to enable various benefits. In many situations, a user may already have information about alternative travel options for a trip from a starting point to a destination, but may lack useful information about how such alternative travel options will compare under actual current conditions or expected conditions in the near future. For example, many users performing their daily commute are aware of several alternative travel options for the trip (e.g., multiple alternative vehicle routes for some or all of the trip, one or more mass transit options for some or all of the trip, etc.), and attempt to select the travel option that they believe is likely to be best given, at best, limited information about current conditions or likely future conditions.

As one particular illustrative example, consider a user commute in which one alternative travel option includes using a particular bus route for a majority of the trip, and this travel option is in many circumstances faster and cheaper than making the trip by private vehicle (e.g., due to the availability of HOV lanes or other advantages available to the bus route, while general-purpose lanes available to private vehicles may be congested and/or have associated tolls). However, some or all of the benefits of this travel option may disappear if parking is not available in a parking lot near a bus stop that the user would use for the bus route, as the time and cost of using this travel option may greatly increase if alternative manners of getting to the bus stop are used (if they are even available). In addition, some or all of the benefits of this travel option may disappear if the general-purpose lanes available to the user's private vehicle are not congested at a particular time and/or have low or no current tolls (e.g., for roads with variable tolling, such as based on time and/or congestion). Furthermore, some or all of the benefits of this travel option may disappear if the user's departure time will result in a long wait at the bus stop for the next bus, and may be further affected based on user preferences related to particular weather conditions (e.g., with the evaluation criteria for the travel option being based not only in part on the amount of time waiting, but also the weather conditions during the wait).

Thus, in this particular example, the identification of a preferred alternative travel option for the user commute is based not on a lack of information about what travel options are available, but instead on their assessed value in the current circumstances with respect to one or more evaluation criteria of interest (e.g., cost, travel time, etc.). Alternatively, in other situations, a user may desire to reach a particular destination location, but have little or no prior experience of possible or preferred ways to get there. In such situations, the identification of one or more alternative travel options, optionally including at least one preferred alternative, includes determining what travel options are available, as well as assessing them with respect to one or more evaluation criteria of interest.

Accordingly, in at least some embodiments, the IMTOA system receives an indication of a trip from a starting location to a destination, and automatically determines, assesses and/or provides various types of trip-related information, including information about multiple alternative inter-modal passenger travel options for the trip. The IMTOA system may further receive from an associated user and/or otherwise gather (e.g., based on previously specified user preferences) information about one or more constraints or preferences for the trip, such as a required arrival time, one or more available departure times, a maximum trip time, a maximum trip cost, etc., and may optionally gather (e.g., receive or otherwise determine) one or more other types of evaluation criteria for use in assessing alternative travel options for the trip. As previously noted, the operations of the IMTOA system may further include gathering (e.g., receiving, retrieving, generating, etc.) various types of data for use in determining and/or assessing the travel options, including one or more of the following: information about current and/or expected future road traffic conditions; information about the schedule for one or more transportation modes that are available for use, such as for one or more mass transit systems and/or routes; information about current and/or expected future variations for one or more transportation modes relative to their schedules, such as delays; information about current and/or expected future parking availability at one or more locations corresponding to use of a particular transportation mode, such as near a bus stop or train station; information about current and/or expected future costs corresponding to some or all of a travel option; information about current and/or expected future weather; etc. In addition, the IMTOA system may gather other types of information about one or more users associated with the trip for use in determining, assessing and/or providing travel options, such as information about available vehicles for the user and/or constraints for the user on use of a particular travel mode (e.g., an inability or unwillingness to walk more than a specified distance; a preference or requirement that a particular type of amenity be available for some or all of the travel option, such as Wi-Fi connectivity, air conditioning, food or beverages, etc.; an inability or unwillingness to operate a particular type of vehicle; an inability or unwillingness to use a particular type of mass transit system; etc.), and/or other user preferences or constraints (e.g., a minimum or maximum time or distance to be exposed to specified type of weather conditions), etc. The various gathered information may be available from various sources, and may be obtained in various manners, as discussed in greater detail below.

After the various types of gathered information are available to the IMTOA system, the system may perform various automated operations to determine alternative travel options for the trip based on the gathered information. In some embodiments and situations, some or all of the alternative travel options may be specified by an associated user, such as based on explicit user input, based on tracking past trips by the user between the same or similar starting and destination locations, etc.

In addition, in some embodiments and situations, some or all of the alternative travel options may be automatically determined by the IMTOA system. For example, various routing algorithms exist that may be used to identify alternative travel options (e.g., the Dijkstra path optimization algorithm; a modified Dijkstra path optimization algorithm, such as the A* algorithm or the Bidirectional A* algorithm; the Transit Node Routing algorithm; the Contraction Hierarchies algorithm; etc.), including routing algorithms that perform best-path analysis with constraints—examples of and details regarding some such routing algorithms are included in Sanders, P. et al., "Engineering Fast Route Planning Algorithms," 6th Workshop on Experimental Algorithms (2007), and Lecture Notes in Computer Science 4525, pp. 23-36 (2007), which is incorporated herein by reference, and which is also available at the time of this filing at citeseerx<DOT>ist<DOT>psu<DOT>edu<SLASH>viewdoc<SLASH>download?doi=10.1.1.85.4223&rep=rep1&type=pdf, where <DOT> represents "." and where <SLASH> represents "/". The IMTOA system may use one or more such routing algorithms to identify alternative travel options, or may interact with one or more other systems that perform such activities and provide the results to the IMTOA system. In such a routing algorithm, each alternative transportation mode between two points may be treated as a separate route between those points, even if the use of the alternative transportation modes follow the same physical path—thus, each of the following examples may be treated as a separate route between the two points: a first bus route between the two points that uses a particular road; a distinct second bus route between the two points that uses the particular road (e.g., an express bus with fewer stops than the first bus route); a private vehicle road between the two points that uses the particular road; and a train route or line between the two points that uses tracks adjacent to the particular road. In addition, the constraints for the routing activities may include some or all of the gathered information, such as, for example, mass transit schedules and associated mass transit embarkation/debarkation locations (e.g., bus stops, train stations, ferry terminals, etc.), parking availability at or near the mass transit embarkation/debarkation locations and/or at or near the destination, estimates of time-to-park at parking locations, information about travel modes and associated times (e.g., an estimated amount of time for a user to walk from a parking lot to a mass transit embarkation/debarkation location, an estimated amount of time for a motorized vehicle to travel between two road locations, etc.), user-associated constraints, etc. Furthermore, for any candidate travel links that include travel along roads, assessed road traffic conditions may be used as part of the process of determining and/or evaluating those travel links, including determining likely travel time under specified conditions and optionally travel time variability and/or certainty associated with the travel—for example, such assessed road traffic conditions may in some embodiments be used to assess travel links involving private vehicle travel on roads, involving bus travel on roads (e.g., if the buses use general-purpose lanes for which assessed road traffic condition information is available, if the buses uses HOV lanes or separate bus-only lanes for which assessed road traffic condition information is available, etc.).

In at least some embodiments, the routing activities include considering one or more travel options that each occur solely via a single personal vehicle of an associated user, and/or include considering one or more inter-modal travel options that each occur via multiple transportation modes during different parts of the travel between the starting and destination locations. When considering inter-modal travel options, the routing activities may include initially selecting potential mass transit embarkation/debarkation locations and associated mass transit travel modes that satisfy any specified constraints, such as a required time-of-arrival at the destination and/or a required total travel time. As a next step, the initial selected potential mass transit embarkation/debarkation locations may be filtered and excluded by using best-path calculations from a prior travel point (e.g., from the starting point) to those mass transit locations, given information about expected current and/or future traffic conditions or other travel-related conditions, parking availability for parking locations at or near those mass transit locations, information about time-to-park at such parking locations, information about time-to-travel between such parking locations and those mass transit locations (e.g., walking time), etc. One or more resulting alternative travel options that are determined to be viable with respect to any timing-related constraints may be further evaluated with respect to other constraints and/or evaluation criteria, including to use assessed road traffic condition information when appropriate to evaluate likely travel times and optionally travel time variability and/or certainty associated with the travel. For example, a total monetary cost associated with each alternative travel option may be determined, and optionally used to filter or otherwise remove an alternative travel option if it exceeds a maximum threshold—such total monetary costs may be based on, for example, one or more of gas prices or other vehicle fuel prices, vehicle fuel efficiency, tolls, parking fees, mass transit usage costs, etc. In addition to, or instead of a total monetary cost, a total travel time cost associated with each alternative travel option may be determined, and optionally used to filter or otherwise remove an alternative travel option if it exceeds a maximum threshold—such total monetary costs may be generated in a manner relative to other alternative travel options or an indicated amount of time or that passes an indicated destination arrival time (e.g., a travel time cost based on a travel time that exceeds the shortest travel time of any of the alternative travel options or that exceeds another indicated time or indicated amount of time), and/or may be generated in an absolute manner (e.g., a total amount of travel time, an estimated arrival time at the destination, etc.). Furthermore, if any other user-specified constraints have been gathered, they may be similarly used to filter any alternative travel options that do not satisfy those constraints (e.g., based on weather conditions, disallowed travel modes, etc.).

After one or more viable alternative travel options are determined for the trip, the IMTOA system may further perform automated activities to assess those travel options with respect to one or more evaluation criteria, including to identify one or more preferred alternative travel options (e.g., a 'best' alternative travel option with respect to the one or more evaluation criteria). As one example, the IMTOA system may in some embodiments and situations identify a lowest cost preferred alternative travel option and a lowest travel time preferred alternative travel option. More generally, the IMTOA system may use any gathered evaluation criteria for the assessment, including any gathered user preference information (e.g., optionally weighted in a user-specified manner or an automatically determined manner).

The IMTOA system may further provide information about one or more preferred alternative travel options to one or more users in various manners, including by displaying or otherwise providing the information to a particular user (e.g., a user who supplied a request that initiated the automated activities of the IMTOA system to determine and/or assess the alternative travel options, a user who supplied a request for information that was previously automatically determined by the IMTOA system, etc.), by providing the information to another system for use by one or more users (e.g., a navigation system used by one or more users, a system that broadcasts or otherwise provides current information about one or more travel options to multiple users, etc.).

As one illustrative example of automatically determining and/or assessing alternative travel options by the IMTOA system, consider an example situation in which there are three candidate mass transit options (using one or more mass transit systems) that are identified as having scheduled arrivals at mass transit debarkation points that are at or near a destination, with those scheduled arrivals being identified as permitting arrival at the destination before a pre-defined time for a desired trip from a starting point to that destination. Each candidate transit option further has one or more mass transit embarkation points that are available to use from the starting point. A travel plan from the starting point to each embarkation transit point is then computed using any of multiple routing algorithms that select a least cost path, as described in greater detail elsewhere, including to use assessed road traffic condition information when appropriate to evaluate likely travel times and optionally travel time variability and/or certainty associated with the travel—the costing factor for the routes can be based on one or more factors including distance, elapsed travel time, tolls on various segments, etc. Once a best path is found from home to each embarkation mass transit point, a corresponding departure time from home is determined to allow arrival at the embarkation mass transit point by a determined intermediate time, which is based on the schedule for the mass transit system and embarkation mass transit point, such as a corresponding scheduled arrival time at that embarkation mass transit point of a particular mass transit conveyance (e.g., bus, train, etc.) having one of the identified scheduled arrivals at or near the destination. If one or more of the debarkation transit points are separated from the destination (e.g., by at least a minimum distance), similar actions may be taken to determine the travel time from the debarkation transit points to the destination, as part of identifying the three candidate mass transit options and their scheduled arrivals that are available for use. Treating each of these candidate transit options and corresponding embarkation mass transit points as an alternative travel option for the desired trip, one or more preferred travel options may be determined in various manners, such as by enabling a user to select one that is most suitable to the user, or by having the automated IMTOA system select one or more preferred travel options based on latest possible departure time and/or lowest monetary cost and/or other specified evaluation criteria (e.g., fewest bus stops, shortest walk from parking area, etc.).

In addition, the IMTOA system may in some embodiments perform various additional operations. For example, when identifying and initially selecting intermodal travel access points (e.g., mass transit embarkation/debarkation locations) to use in determining candidates for alternative travel options, the IMTOA system may in some embodiments require that one or more intermodal travel access points be considered (e.g., based on user instructions or preferences) and/or give preferences (positive and/or negative) to or exclude some such intermodal travel access points (e.g., based on one or more factors, including by falling above or below a defined threshold for the factors, such as travel time to reach, distance to reach, confidence or variability in travel time to reach, confidence or variability in travel time to use the resulting mass transit option, degree that travel using the mass transit option heads toward the destination, parking availability, ease of access, etc., and more generally based on user instructions or preferences). Intermodal travel access points may also be rated on other factors that are used for preferences and/or exclusion, such as based on having too many connections or including a less desirable link (e.g., to avoid a transfer at a station with too many connections or difficult connections or with a connection to a travel link with a low on-time arrival rate or confidence level). With respect to positive or negative preferences, they may be represented in various manners (e.g., using weighting), and may be used in various manners—for example, a search or evaluation of candidates for alternative travel options may begin with the most preferred intermodal travel access point and continue in decreasing preference, optionally stopping at some point (e.g., when a preference threshold is reached, when a certain number of alternative travel options have been considered, when a certain amount of processing time has occurred, etc.). In addition, in some situations, after a first intermodal travel access point of a certain type is considered, some or all other intermodal travel access points of that type may be ignored or given an lower preference—for each, after a particular bus stop or train station along a particular route has been selected (e.g., the nearest to a starting point of a trip, the largest within a specified area, etc.), other upstream and/or downstream stops or stations along the route may be ignored or have a lowered preference.

Furthermore, the IMTOA system may in some embodiments consider various other factors, such as with respect to evaluation criteria for alternative travel options. For example, a confidence and/or variability in travel time may be considered for a portion of travel (e.g., based on a standard deviation or other statistical measure of variability), such as along with an average or otherwise expected amount of travel time (e.g., a mathematical mean, mathematical median, mathematical mode, etc.)—thus, private vehicle travel on congested roads with higher travel variability may in some such embodiments be rated lower relative to mass transit options with less variability. In addition, a total distance traveled could be considered, such as to penalize private vehicle travel that goes further distances away from a shortest route (even if faster). Furthermore, in some embodiments, social network or other user community aspects could be used, such as to use community ratings or preferences for particular intermodal travel access points and/or travel links as part of determining particular alternative travel routes and/or as part of evaluating particular alternative travel routes. It will be appreciated that various other factors may similarly be considered and used in various embodiments.

Thus, as noted above, the use of the IMTOA system may provide various benefits in various situations. For example, in at least some embodiments, the IMTOA system assesses multiple alternative travel options for a given trip with respect to one or more evaluation criteria, including cost and/or travel times, and provides the assessment information to enable improved user travel. For example, one or more users may be able to select a particular preferred travel option given the current conditions and any particular user preferences. By using such assessment information for intermodal travel options (e.g., a travel option including personal vehicle use and use of one or more mass transit systems), the IMTOA system may provide increased accuracy regarding use of such inter-modal travel options. Furthermore, by varying specified constraints (e.g., required arrival time, maximum travel time, etc.), a user may further tailor his or her trip in a user-controlled manner.

Figure 5:
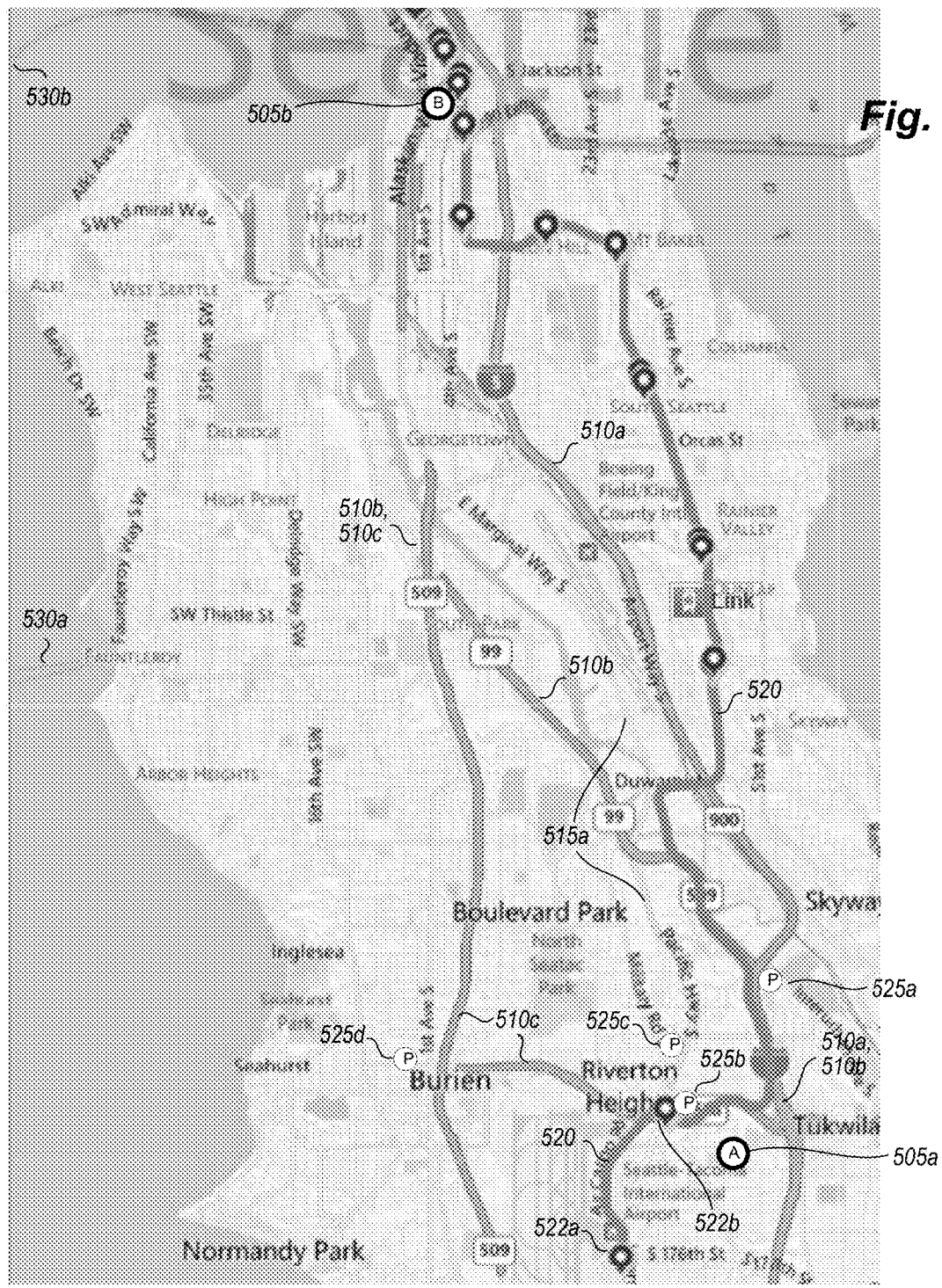
FIG. 5 illustrates examples of determining and assessing inter-modal travel options in specified situations.

FIG. 5 illustrates examples of determining and assessing travel options in particular situations. In particular, a portion of a geographic area is shown (in this example, part of Seattle and some of its surrounding suburbs), along with an example starting location and destination location. In particular, in this example a user at an indicated starting location A 505*a* (e.g., the user's home) is interested in traveling to a destination location B 505*b* in downtown Seattle (e.g., the user's workplace).

A number of different travel modes and corresponding inter-modal travel options are available in this example for travel from the starting location A to the destination location B. For example, several major highways are available on which the user may travel at least a portion of a route from the starting location to the destination location, including based on a route 510*a* that includes use of the Interstate 5 freeway, a route 510*b* that includes use of Highway 99 (as well as portions of Interstate 5 and Highway 509), a route 510*c* that includes use of portions of Highway 518 and Highway 509, etc. Thus, if the user has a private vehicle (e.g., a car, truck, motorcycle, etc.), a first determined travel option may include using route 510*a* (including driving on surface streets near the starting location to reach Interstate 5, and driving on surface streets near the destination location after leaving Interstate 5), a second determined travel option may include using route 510*b* (similarly including short portions on surface streets), and a third determined travel option may include using route 510*c* (similarly including short portions on surface streets). In addition, if the user has different private vehicles that have different associated travel characteristics (e.g., a car that only has access to use general-purpose lanes on a highway that is part of a route, and a motorcycle that is allowed to access HOV, or high occupancy vehicle, lanes on that highway), the use of such different vehicles on such a route may similarly be treated as different alternative travel options. Furthermore, if different candidate parking locations near the destination location exist, the use of each such candidate parking location with a particular route may further in some embodiments be treated as a distinct travel option, such as with different availability to use (e.g., to remove as a travel option if the associated candidate parking location has parking availability that is actually below or estimated to be below a specified threshold that is being used as a constraint on travel options to be considered). It will be appreciated that a variety of types of constraints may be specified by a user and/or automatically employed by the IMTOA system to use in selecting or removing possible routes.

For each of these various determined alternative travel options based on use of a private vehicle, the travel option may be assessed based at least in part on one or more estimated monetary costs (e.g., the estimated cost of gas based on distance and time traveled; fees for parking, if any, at or near the destination location B; tolls, if any, related to use of particular roads or lanes on those roads, such as HOT, or high occupancy toll, lanes; etc.), on an estimated travel time (e.g., based on estimated driving times on any surface streets; estimated driving times on the highways or on particular lanes of the highways; estimated walking time, if any, from a parking location near the destination location to the actual destination location; etc.), on an estimated variability or uncertainty in estimated travel time (e.g., to prefer a travel option with a slightly longer average travel time if an upper bound on variability in the travel time for the travel option is lower than that of another travel option), etc. It will be appreciated that some or all travel options may be assessed with respect to factors or criteria other than monetary cost and time in at least some embodiments and situations. In addition, in order to assess such travel options that use a private vehicle in whole or in part, the IMTOA system embodiment may obtain various types of travel-related information, such as information corresponding to current actual traffic conditions and/or expected traffic conditions in order to generate travel times and optionally monetary costs (e.g., corresponding to amount of gas used based on travel time, current actual or expected tolls, etc.), and may also access and use information about parking availability and fees corresponding to parking location options at or near the destination location B.

In addition to the routes 510 based in part on use of the highways, other travel routes may be available for driving a personal vehicle, such as route 515a using major arterial streets (in this example, Pacific Highway South and East Marginal Way South), as well as other routes (not shown) involving only non-arterial surface streets. Thus, depending on user preferences and other constraints specified, an embodiment of the IMTOA system may further determine one or more additional travel options corresponding to use of such arterial streets and/or surface streets.

In addition to the use of a private vehicle for the entire travel, one or more travel options may be determined and assessed corresponding to use of buses or other mass transit vehicles on the roads for some or all of the travel between locations A and B. In particular, in this example, a number of bus routes are available to the user, including one or more bus routes traveling along each of routes 510a, 510b, 510c, and 515a, as well as other bus routes with less direct connections that may travel on more intervening surface streets and arterials. Accordingly, some or all such bus routes may each be used to determine one or more route options corresponding to its use, such as by treating a combination of a particular bus route, bus embarkation point, bus pickup time (or particular bus vehicle), and optionally bus disembarkation point as a distinct determined travel option. For example, one or more such bus routes may each pass sufficiently close to the starting location A that the user is able to access an embarkation point for the route without using a private motorized vehicle (e.g., by walking or bicycling to the embarkation point), and other embarkation points for the route may correspond to park-and-ride locations to which the user may drive in a personal vehicle and then transfer to the bus. In this example, available park-and-ride locations that may correspond to different determined travel options include park-and-ride location 525a (which may be used, for example, for traveling on routes 510a or 510b), park-and-ride location 525b (which may be used, for example, for traveling on routes 510a, 510b, 510c, and 515a), park-and-ride location 525c (which may be used, for example, for traveling on route 515a), and park-and-ride location 525d (which may be used, for example, for traveling on route 510c)—other park-and-ride locations may similarly be available for use, but are not shown in this example. Thus, in order to assess one or more determined travel options that include the use of park-and-ride location 525d, for example, the IMTOA system may determine travel times and costs for the user to drive in a private vehicle from starting location A to the park-and-ride location 525d, time and fees (if any) associated with parking at the location 525d (e.g., based at least in part on current or expected parking availability, current or expected parking charges, etc.), time and costs associated with embarking and using one or more corresponding bus routes from the location 525d (based at least in part on bus route schedule information; current or expected delays or other variations in actual bus arrival and departure relative to the schedules, such as with respect to particular bus vehicles; current or expected bus fare information; etc.), and time associated with walking from a disembarkation point to the destination location. In some situations, a particular determined travel option may include the use of two or more distinct bus routes, such as to use a first local bus route to travel from an embarkation location near starting location A to a transfer point (e.g., park-and-ride location 525b), to use a second bus route to travel from the transfer point to a second disembarkation location closer to the destination location B (e.g., to a second disembarkation location near downtown Seattle), and optionally to use a third bus route to travel from the second disembarkation location to a third disembarkation location at or near the destination location B.

As another alternative, a light rail line 520 also is available for use in the geographic area, and it includes multiple embarkation stations 522 near the starting location A, including locations 522a and 522b, as well as multiple debarkation stations near the destination location B. Accordingly, one or more travel options may be determined corresponding to use of the light rail train, such as to have a first such travel option corresponding to the user walking to embarkation location 522a and boarding the light rail train at that location, a second such determined travel option corresponding to the user walking to the embarkation location 522b and boarding the light rail train at that location, a third such determined travel option corresponding to the user driving to the park-and-ride location 525b and boarding the light rail train at the embarkation location 522b, a fourth such determined travel option corresponding to the user bicycling to the embarkation location 522b and boarding the light rail train at that location, a fifth such determined travel option corresponding to the user taking a local bus to the embarkation location 522b and boarding the light rail train at that location, etc. In a manner similar to that discussed with respect to previous determined travel options, such travel options including the use of a light rail train may be assessed based at least in part on time and monetary costs, including based on time to walk or bicycle or bus (as appropriate) to embarkation locations 522a or 522b from the starting location, time to drive to and park at the park-and-ride location 525b and to walk from the location 525b to the embarkation location 522b, etc., as well as times associated with waiting for and riding the light rail train based on actual or expected train location information or otherwise using train schedule information. Various information may be used as constraints to remove what would otherwise be a determined travel option (or lower its assessed value), such as to remove a travel option as a candidate to use at a current time if the travel option uses a park-and-ride location but there is no parking availability there (or the parking availability there is otherwise below a specified threshold), if the travel option uses a particular bus on a particular route but information is available indicating that the bus is full, etc.

Other travel modes and corresponding determined travel options may similarly be available, but may not be used in typical circumstances. As one example, another travel mode that is available for at least a portion of travel between locations A and B includes the use of one or more ferries, such as based on ferry routes 530a and 530b. In typical circumstances, the length of time delay in traveling to the ferry terminal from which ferry route 530a would depart, and the corresponding time and costs of the ferry ride(s) may cause any travel options corresponding to ferries, to not be considered or to be removed relative to other determined travel options. However, in certain situations such a travel mode may become part of a viable or even a preferred travel option—for example, if a disaster or a region-wide problem caused roads south of downtown Seattle to be closed or have extreme delays (e.g., such as Interstate 5, Highway 509, arterial East Marginal Way South, etc.), one or more determined travel options using such ferry routes may instead be determined and assessed in such situations.

While not illustrated here in details, different travel options may similarly be analyzed and assessed with respect to different travel near the destination location B, such as with respect to different destination parking locations, different debarkation points for bus routes and the light rail train, etc.

It will be appreciated that various of the details described with respect to FIG. 5 are provided for the sake of illustration, and are not intended to limit the scope of the invention described herein. The described techniques may be used for determining and assessing travel options in other types of situations in other embodiments, including travel that spans multiple geographic areas (e.g., to include longer-distance travel modes such as inter-city rail, airplanes, etc.).

In addition, the IMTOA system gathers and uses traffic-related information together with information about one or more mass transit travel mode types in at least some embodiments, such as to assess information about personal vehicle travel to and/or from an embarkation/debarkation location for the mass transit type. In addition, the IMTOA system may further use traffic-related information in some situations to assess information about an operational status of a mass transit system (e.g., to assess likely variations from published schedules for a bus route based on traffic-related information for one or more roads along some or all of that route). The traffic-related information may, for example, include historical, current (e.g., real-time) and/or predicted (e.g., future or current) traffic conditions of one or more types. By combining such traffic-related information with other information (e.g., information about mass transit options), the IMTOA system may provide increased accuracy regarding use of particular inter-modal travel options that include a combination of private vehicle use and mass transit use.

Furthermore, in at least some embodiments, the IMTOA system gathers and uses parking-related information together with information about one or more mass transit travel mode types, such as to consider information about parking availability and/or cost for personal vehicles that are used to travel to and/or from an embarkation/debarkation location for the mass transit type. The parking-related information may, for example, include historical, current (e.g., real-time) and/or predicted (e.g., future or current) information of one or more types, including availability, cost, and time-to-park. By combining such parking-related information with other information (e.g., information about mass transit options), the IMTOA system may provide increased accuracy regarding availability and use of particular inter-modal travel options that include a combination of private vehicle use and mass transit use.

Moreover, in at least some embodiments, the IMTOA system gathers and uses weather-related information together with information about one or more mass transit travel mode types, such as to consider information about weather conditions when traveling to and/or from an embarkation/debarkation location for the mass transit type (e.g., between a parking lot and the mass transit location) and/or when waiting at the embarkation/debarkation location for a mass transit conveyance to arrive. The weather-related information may, for example, include historical, current (e.g., real-time) and/or predicted (e.g., future or current) information of one or more types, including temperature, precipitation, wind, pollen, etc. By combining such weather-related information with other information (e.g., information about mass transit options), the IMTOA system may provide increased accuracy regarding desirability of use of particular inter-modal travel options that include a combination of private vehicle use and mass transit use.

As noted above, the operations of the IMTOA system may be performed in various manners in various embodiments. In some embodiments and situations, the IMTOA system may perform some or all of its activities in a manner specific to one or more particular users (e.g., in response to a request from those users), including to optionally use user-specific constraints, preferences and associated travel-related information (e.g., information about one or more personal vehicles of the user, information about one or more travel-related capabilities of the user, information about historical trips of the user, etc.)—in such embodiments, at least some of the information gathered by the IMTOA system may be provided by the user(s), such as a starting location (e.g., explicitly input, automatically determined based on a current or expected location of the user(s), etc.), a destination location, particular user constraints, particular evaluation criteria, etc. In addition, in some embodiments and situations, the IMTOA system may perform some or all of its activities in a manner that is not specific to any particular users, such as to evaluate alternative travel options between two locations using default or otherwise standardized values for one or more evaluation criteria (e.g., vehicle fuel efficiency, vehicle type options, etc.). The starting locations and/or destination locations for a trip may also have various forms in various embodiments, such as point locations or geographic areas (e.g., a city block, a city neighborhood, a city, a multi-city region, etc.).

It will also be appreciated that a given alternative travel option may include multiple portions of travel along different transportation modes, and that such transportation modes may be interconnected in various manners. For example, as previously noted, a mass transit option may have one or more mass transit embarkation/debarkation locations that are candidates for use in a particular travel option, and each such mass transit embarkation/debarkation location may be connected with one other transportation modes in various manners (e.g., by being within a specified distance and/or travel time of another transportation mode, such as a parking lot at which a private vehicle may be located; by being within a specified distance and/or travel time of another mass transit embarkation/debarkation location, such as for a transfer between two mass transit routes of the same or different mass transit type; etc.).

The particular details described above with respect to the example IMTOA system embodiment are for illustrative purposes, and it will be appreciated that other IMTOA system embodiments may operate in other manners.

FIG. 1 is a block diagram illustrating an embodiment of a server computing system 100 that is suitable for performing at least some of the described techniques, such as by executing an Inter-Modal Travel Option Assessment system. The example server computing system 100 includes one or more central processing unit ("CPU") processors 135, various input/output ("I/O") components 105, storage 140, and memory 1550. Illustrated I/O components in this example embodiment include a display 110, a network connection 115, a computer-readable media drive 120, and other I/O devices 130 (e.g., keyboards, mice or other pointing devices, microphones, speakers, etc.).

In the illustrated embodiment, an IMTOA system 160 is executing in memory 150, as are several other optional systems 152, 154, 156 and 158. In particular, in this example, the other optional systems include an optional traffic information provider system 152 that may, for example, provide historical, current (e.g., real-time) and/or predicted (e.g., future or current) traffic-related information for one or more types of traffic conditions, optionally after generating some or all such information. The other optional systems in this example further include an optional transit information provider system 154 that may, for example, provide historical, current (e.g., real-time) and/or predicted (e.g., future or current) transit-related information for one or more types of mass transit systems, such as transit schedules, transit embarkation/debarkation location information, transit usage costs, information about transit system variations from schedule (e.g., historical variations, real-time current variations and/or predicted future or current variations). The other optional systems in this example further include an optional parking information provider system 156 that may, for example, provide historical, current (e.g., real-time) and/or predicted (e.g., future or current) parking-related information for one or more parking locations (e.g., parking lots, spaces, garages, streets, regions, etc.), such as for parking availability, parking cost and/or time-to-park information. The other optional systems in this example further include one or more optional other systems provided by other programs 158. The systems 160 and 152-158 are generally referred to herein as travel option analysis systems.

The server computing system 100 and its executing travel option analysis systems may communicate with other computing systems, such as various client devices 182, vehicle-based clients and/or data sources 184, road traffic sensors 186, other data sources 188, and third-party computing systems 190, via network 180 (e.g., the Internet, one or more cellular telephone networks, etc.) and optionally wireless communication link(s) 185. In at least some embodiments, only the IMTOA system 160 may be executed on the server computing system 100, such as if the executed system interacts with corresponding information or systems (e.g., other optional travel option analysis systems) elsewhere (e.g., on one or more third-party computing systems 190, such as under control of third-party entities), while in other embodiments a single system executing on the server computing system 100 may include some or all of the functionality of the IMTOA system 160 and one or more of the other optional travel option analysis systems. While not illustrated here, in other embodiments some or all of the IMTOA system may execute on behalf of a single user or a single entity (e.g., an organization with multiple employees or other members), including to execute on one or more computing systems or computing devices of such a single user (e.g., on a smart phone or other mobile computing device, on a navigation device or system within a vehicle of the single user, on a fixed-location computing system in use by the user, etc.).

The client devices 182 may take various forms in various embodiments, and may generally include any communication devices and other computing devices capable of making requests to and/or receiving information from the travel option analysis systems. In some cases, the client devices 182 may include mobile devices that travel on particular roads (e.g., handheld cell phones or other mobile devices with GPS capabilities or other location determination capabilities that are carried by users traveling in vehicles, such as operators and/or passengers of the vehicles), and if so, such client devices may act as mobile data sources that provide current traffic data based on current travel on the roads (e.g., if the users of the client devices are on the roads). In addition, in some situations the client devices may run interactive console applications (e.g., Web browsers, smart phone apps, etc.) that users may utilize to make requests 195 for generated information related to one or more travel options (e.g., preferred alternative travel options from the IMTOA system 160) and/or to provide information for use by the IMTOA system 160 (e.g., vehicle type information, driver preference information, etc.), with corresponding response information being provided 195 as appropriate, while in other cases at least some such generated travel option-related information may be automatically sent 195 to the client devices (e.g., as text messages, new Web pages, specialized program data updates, etc.) from one or more of the travel option analysis systems without having received an explicit corresponding request, including to provide real-time or near-real-time information about current travel option information (e.g., a real-time map that includes current assessments of one or more alternative travel options for a current trip).

The vehicle-based clients/data sources 184 in this example may each include a computing system located within a vehicle that provides data to one or more of the travel option analysis systems and/or that receives data from one or more of those systems, including to similarly make requests 195 for generated travel option-related information and/or to receive 195 generated travel option-related information. In some embodiments, the traffic-related information used by the IMTOA system 160 may originate at least in part from a distributed network of vehicle-based data sources that provide information related to then-current traffic conditions. For example, each vehicle may include a GPS ("Global Positioning System") device (e.g., a cellular telephone with GPS capabilities, a stand-alone GPS device, etc.) and/or other geo-location device capable of determining the geographic location, speed, direction, and/or other data related to the vehicle's travel. One or more devices on the vehicle (whether the geo-location device(s) or a distinct communication device) may occasionally gather such data (e.g., a plurality of data samples that each indicate at least a then-current geographic location and associated time, optionally along with additional information) and provide it to one or more of the travel option analysis systems (e.g., by way of a wireless link). In addition, a system provided by one of the optional other travel option analysis systems may obtain and use current road traffic conditions information, transit-related information and/or parking-related information in various ways, and such information (whether as originally obtained or after being processed) may later be used by the IMTOA system 160 as historical data. Such vehicles may include a distributed network of individual users, fleets of vehicles (e.g., for delivery companies, transportation companies, governmental bodies or agencies, vehicles of a vehicle rental service, etc.), vehicles that belong to commercial networks providing related information (e.g., the OnStar service or other similar services), a group of vehicles operated in order to obtain such traffic conditions information (e.g., by traveling over predefined routes, or by traveling over roads as dynamically directed, such as to obtain information about roads of interest), etc. In addition, such vehicle-based information may be generated in other manners in other embodiments, such as by cellular telephone networks, other wireless networks (e.g., a network of Wi-Fi hotspots) and/or other external systems (e.g., detectors of vehicle transponders using RFID or other communication techniques, camera systems that can observe and identify license plates and/or users' faces) that can detect and track information about vehicles passing by each of multiple transmitters/receivers in the network.

The road traffic sensors 186 include multiple sensors that are installed in, at, or near various streets, highways, or other roadways, such as for one or more geographic areas. These sensors include loop sensors that are capable of measuring the number of vehicles passing above the sensor per unit time, vehicle speed, and/or other data related to traffic conditions. In addition, such sensors may include cameras, motion sensors, radar ranging devices, and other types of sensors that are located adjacent to a roadway. The road traffic sensors 186 may periodically or continuously provide measured data via wire-based or wireless-based data link to one or more of the travel option analysis systems via the network 180 using one or more data exchange mechanisms (e.g., push, pull, polling, request-response, peer-to-peer, etc.). For example, a system provided by one of the other programs 162 may obtain and use current road traffic conditions information in various ways, and that such information (whether as originally obtained or after being processed) may later be used as historical information by the IMTOA system 160 (e.g., as part of determining traffic conditions during which particular historical vehicle trips occurred). In addition, while not illustrated here, in some embodiments one or more aggregators of such road traffic sensor information (e.g., a governmental transportation body that operates the sensors, a private company that generates and/or aggregates data, etc.) may instead obtain the traffic data and make that data available to one or more of the travel option analysis systems (whether in raw form or after it is processed). In some embodiments, the traffic data may further be made available in bulk to the travel option analysis systems.

The other data sources 188 include a variety of types of other sources of data that may be utilized by one or more of the travel option analysis systems. Such data sources include, but are not limited to, holiday and season schedules or other information used to determine how to group and categorize historical data for specific days and times, schedule information for non-periodic events, schedule information related to traffic sessions, schedule information for planned road construction and other road work, road map data (e.g., to indicate locations of particular roads; connections between roads; particular road features that are traffic flow impediments; boundaries of particular traffic flow impediments, such as a start and end location for a traffic flow impediment when traveling in a particular direction on the road that includes that traffic flow impediment; etc.). In addition, in at least some embodiments, such other data sources may provide static transit-related information (e.g., schedules, non-variable fees, etc.) and/or variable transit-related information (e.g., current variations from schedules, such as being X minutes ahead or behind schedule for a particular conveyance on a particular mass transit route or having an average of X minutes ahead or behind schedule for all conveyances on a particular mass transit route or system; current system outages or other departures from schedules; etc.). Furthermore, in at least some embodiments, such other data sources may provide weather-related information (e.g., forecasts, current conditions, etc.). Various data may also in some embodiments be stored on the server computing system 100 or elsewhere in order to be accessible for use by one or more of the travel option analysis systems, such as in a traffic database data structure 141 on storage 140, in a transit database data structure 142 on storage 140, in a parking database data structure 143 on storage 140, in a user database data structure 144 on storage 140, and/or in a cost-related database data structure 146 on storage 140.

Third-party computing systems 190 include one or more optional computing systems that are operated by parties other than the operator(s) of the IMTOA system 160, such as parties who provide current, historical and/or predicted traffic data, transit data, parking data and/or weather data to the travel option analysis systems, and/or parties who receive and make use of traffic-related data provided by one or more of the travel option analysis systems. For example, the third-party computing systems may be map vendor systems that provide data (e.g., in bulk) to the travel option analysis systems. In some embodiments, data from third-party computing systems may be weighted differently than data from other sources. Such weighting may indicate, for example, how many measurements participated in each data point. Other third-party computing systems may receive generated information from one or more of the travel option analysis systems and then provide related information (whether the received information or other information based on the received information) to users or others (e.g., via Web portals or subscription services). Alternatively, the third-party computing systems 190 may be operated by other types of parties, such as media organizations that gather and report such traffic-related information to their consumers, or online map companies that provide such traffic-related information to their users as part of travel-planning services.

In the illustrated embodiment of FIG. 1, the IMTOA system 160 includes a Travel Option Determiner module 164, a Travel Option Assessor module 166 and an Information Supplier module 168. The IMTOA system gathers various types of data from one or more of various sources, such as from one or more databases 141-146 on storage 140, from one or more optional travel option analysis systems 152-158, and/or from one or more other sources 182-190. In some embodiments, the IMTOA system 160 may also optionally aggregate obtained data from a variety of data sources, and may further perform one or more of a variety of activities to prepare data for use, such as to place the data in a uniform format; to discretize continuous data, such as to map real-valued numbers to enumerated possible values; to sub-sample discrete data; to group related data (e.g., a sequence of multiple traffic sensors located along a single segment of road that are aggregated in an indicated manner); to filter particular data; to weight particular data; etc.

After gathering the various data, the Travel Option Determiner module 164 of the IMTOA system 160 then analyzes the gathered data for use in determining one or more alternative travel options for each of one or more possible trips, such as in response to requests or as otherwise programmed to automatically do so. As discussed in greater detail elsewhere, the determining one or more alternative travel options may be performed in various manners, including based in part on user input, on historical user trips, on routing algorithms that consider multiple available transportation modes (and optionally use various types of constraint information), etc., including to filter and exclude possible travel options that are not viable with respect to specified constraints. Such determined alternative travel options information may be stored for later use (e.g., in an alternative travel options information database of storage 140, not shown), and/or may be directly provided by the IMTOA system 160 to other systems (e.g., one of the other optional travel option analysis systems 152-158, a third-party computing system 190, etc.) for further use. The module 164 may further use other types of data in at least some embodiments as part of its operations, such as road map data.

In addition, the Travel Option Assessor module 166 of the IMTOA system 160 may analyze one or more alternative travel options determined by the module 164 in one or more manners, such as to assess those alternative travel options with respect to one or more predefined evaluation criteria (e.g., default criteria) and/or user-specific evaluation criteria. As discussed in greater detail elsewhere, the assessing of alternative travel options may be performed in various manners, including based on time-related criteria and/or cost-related criteria, and optionally to consider user-specific preference information. The resulting assessment information may be stored for later use (e.g., in the alternative travel options information database of storage 140, not shown), and/or may be directly provided by the IMTOA system 160 to other systems (e.g., one of the other optional travel option analysis systems 152-158, a third-party computing system 190, etc.) for further use. The module 166 may further use other types of data in at least some embodiments as part of its operations.

After the IMTOA system 160 has determined one or more alternative travel options for one or more trips and/or generated assessment information for one or more alternative travel options, other systems (e.g., one of the other optional travel option analysis systems 152-158, a third-party computing system 190, etc.) may use that information in various ways, including to provide particular recommended or preferred travel options between locations to users. In particular, the Information Supplier module 168 may provide such information upon request or as otherwise automatically determined to do so, including in some embodiments to provide such information directly to users. For example, the module 168 may supply such information to various external clients (e.g., to users of clients 182 and/or 184; to navigation systems and other systems that may interact with such users; to other travel option analysis systems; to other external systems, such as systems executing on computing systems 190; etc.), including in situations in which the provided information includes one or more particular preferred travel options for a trip between particular locations that is provided in response to a request from a client.

It will be appreciated that the illustrated computing systems are merely illustrative and are not intended to limit the scope of the present invention. Computing system 100 may be connected to other devices that are not illustrated, including through one or more networks such as the Internet or via the Web. More generally, a "client" or "server" computing system or device, or travel option analysis system and/or module, may comprise any combination of hardware that can interact and perform the described types of functionality, optionally when programmed or otherwise configured with software, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated system modules may in some embodiments be combined in fewer modules or distributed in additional modules. Similarly, in some embodiments the functionality of some of the illustrated modules may not be provided and/or other additional functionality may be available.

In addition, while various items are illustrated as being stored in memory or on storage while being used, these items or portions of them can be transferred between memory and other storage devices for purposes of memory management and/or data integrity. In at least some embodiments, the illustrated modules and/or systems are software modules/systems that include software instructions that, when executed by the CPU 135 or other processor, program that processor to automatically perform the described operations for that module/system. Alternatively, in other embodiments some or all of the software modules and/or systems may execute in memory on another device and communicate with the illustrated computing system/device via inter-computer communication. Furthermore, in some embodiments, some or all of the modules and/or systems may be implemented or provided in other manners, such as at least partially in firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 2A:
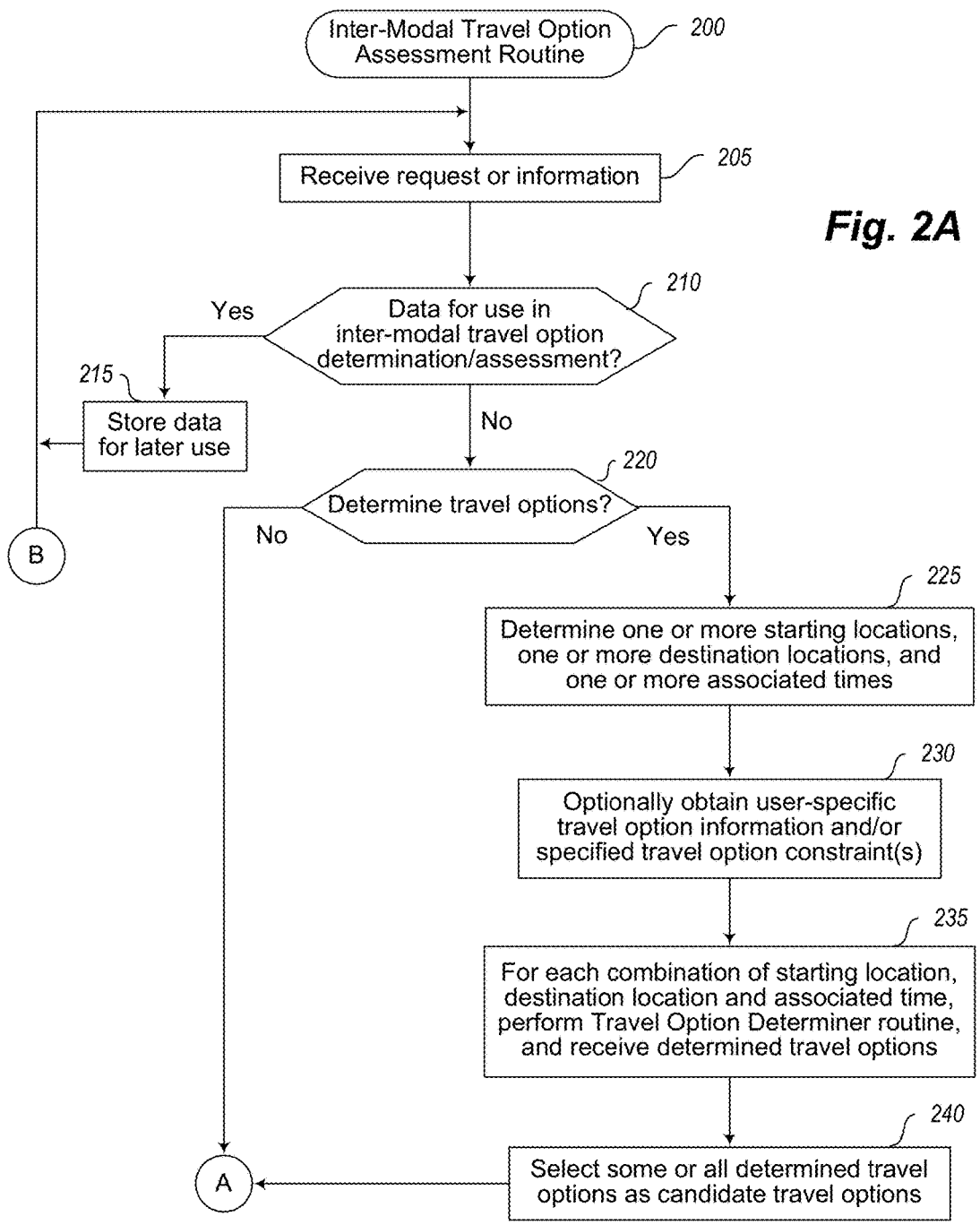
FIGS. 2A-2B are an example flow diagram of an illustrated embodiment of an Inter-Modal Travel Option Assessment routine.
Figure 2B:
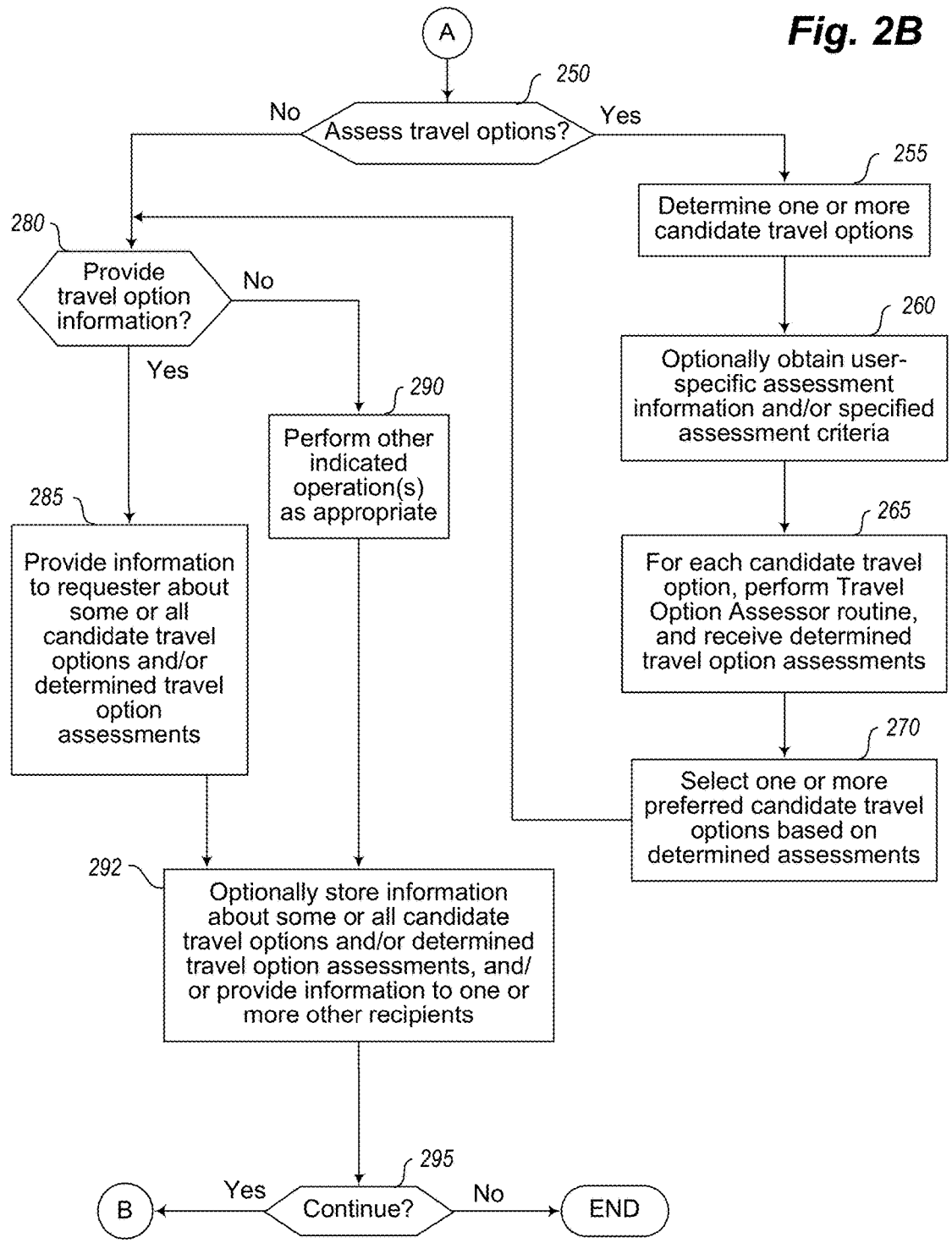

FIGS. 2A-2B are an example flow diagram of an illustrated embodiment of an Inter-Modal Travel Option Assessment routine 200. The routine may be provided by, for example, execution of an embodiment of the Inter-Modal Travel Option Assessment system 160 of FIG. 1, such as to obtain and analyze information about multiple alternatives for travel from a starting location to a destination location at one or more times that may use multiple alternative modes of transportation in whole or in part for the travel. Such information about alternative travel options and their assessed value with respect to one or more evaluation criteria may then be used in various manners, as discussed in greater detail elsewhere, including to assist a particular user in selecting and using a particular travel option at a particular time given actual or predicted travel-related conditions at that time. The routine 200 may be performed, for example, based on use of software instructions of an embodiment of the Inter-Modal Travel Option Assessment system, such as when executed by one or more processors of one or more computing systems to configure those processors and those computing systems to perform the routine.

The illustrated embodiment of the routine 200 begins at block 205, where information or a request is received. The routine continues to block 210 to determine if data has been received that may be of use in determining and/or assessing inter-modal travel options for one or more users, and if so continues to block 215 to store the received data for later use. As discussed in greater detail elsewhere, such received data may have various forms in various embodiments, including information about current and/or expected road traffic conditions, information about schedules for one or more mass transit transportation modes and/or information about actual or expected variations at one or more times from such schedules (e.g., with respect to particular vehicles in use for that transportation mode), information about current and/or expected parking availability at one or more locations corresponding to one or more transportation modes, information about current and/or expected costs corresponding to use of some or all of one or more travel options, information about other travel-related conditions that may affect travel (e.g., current and/or expected weather), etc. Such data may also be received from various sources in various embodiments and at various times, as discussed in greater detail elsewhere, including based on the routine 200 requesting such data and receiving it in response, and/or based on one or more external data sources pushing the data to the routine 200 (e.g., after a prior indication by the routine 200 of interest in such data).

If it is instead determined in block 210 that data has not been received for use in determination and/or assessment of inter-modal travel options, the routine continues instead to block 220 to determine whether a request or other information has been received to initiate the determination of one or more travel options. If so, the routine continues to block 225 to determine one or more starting locations, one or more destination locations, and one or more associated times, and in block 230 optionally obtains user-specific travel option information and/or specified travel option constraints for use in the determination of appropriate travel options. The information in blocks 225 and 230 may be determined and obtained in various manners, including to be received in block 205, retrieved from previous specified information (e.g., based on an indication of a particular user, such as to retrieve user-specific travel-related constraints or preferences for the user, including those previously specified by the user and/or automatically determined for the user based on an analysis of travel patterns of the user or using other information). In some embodiments and situations, a single starting location and destination location may be indicated, optionally along with an associated time (e.g., the current time, such as for travel that has begun or is expected to begin soon; one or more indicated future times; etc.). In addition, in some embodiments and situations, some or all such information may be supplied by a requesting software application associated with a user (e.g., executing on a mobile device or fixed-location system of the user), such as if the application automatically determines a current location of a user to use as a starting location, if the application automatically supplies the request repeatedly (e.g., a request that is sent in each workday for a commute to determine available travel options based on current conditions for that day in accordance with specified constraint information, etc.).

The one or more associated times may have various forms and be used in various manners in various embodiments and situations, including to have a single indicated time that corresponds to the preferred beginning of travel (e.g., if a goal is to reach an indicated destination as soon as possible and/or at a lowest cost, based on travel beginning at that time), an indicated preferred arrival time at the destination (e.g., if the goal is to reach the destination at or before the indicated time, such as to use the quickest or cheapest travel option that will achieve that goal), or one or more other types of associated times (e.g., an indicated length of time, such as for the travel option to complete travel in that amount of time or less; one or more ranges of times, such as to begin and/or end travel within the range(s); one or more indicated times that correspond to particular intermediate locations between the starting location and destination location, such as to indicate times at which the travel option is to have the user arrive or depart at the corresponding intermediate locations; etc.). The information obtained or determined in blocks 225 and 230 may similarly be supplied from various sources, such as from a particular user entering the information via a graphical user interface (e.g., on a home computer, on a software application executing on a mobile smart phone or other mobile computing device of the user, etc.), from another system (e.g., by a navigation, routing, or mapping software application or device, such as a device that is part of or carried in a vehicle of a user, that is executing on a mobile device of a user, etc.) that has received some or all such information from the user or another source, etc. While travel option constraints may in some embodiments be specified as part of a received request or based on previous information associated with a particular user, in other embodiments the travel option constraints that are used may instead be specified by the routine 200 (e.g., as defaults to use unless overridden by other specified information, as constraints that are used for all users and requests, etc.).

After block 230, the routine continues to block 235 to obtain information about determined travel options corresponding to the information obtained and determined in blocks 225 and 230. In particular, in block 235, for each combination of one of the starting locations, destination locations, and associated times, a Travel Option. Determiner routine is invoked, with zero or more determined travel options received as output of the routine corresponding to that combination of information, and with the various returned determined travel options aggregated for further user. One example embodiment of such a Travel Option Determiner routine is discussed in greater detail with respect to FIG. 3. While in the illustrated embodiment the Travel Option Determiner routine is invoked separately for different combinations of information, it will be appreciated that in other embodiments some or all of the types of information that are determined and obtained in blocks 225 and 230 may instead be supplied at a single time to an analogous Travel Option Determiner routine, with that routine then determining and returning travel options corresponding to some or all combinations of information as appropriate. After block 235, the routine continues to block 240 to select, if more than one determined travel option is received in the aggregated response information from the Travel Option Determiner routine, one or more of those determined travel options (e.g., all, based on a specified minimum and/or maximum threshold, etc.) as candidate travel options for further assessment. In addition, in some embodiments and situations, the determined candidate travel options of block 240 may be returned as the response to the request received in block 205 without performing any further assessment of those candidate travel options (such as with respect to blocks 250-270).

After block 240, or if it was instead determined in block 220 that the request or information received in block 205 was not a request to determine travel options, the routine continues to block 250 to determine whether a request was received in block 205 to assess one or more travel options. If so, the routine continues to block 255 to determine one or more candidate travel options to assess, and in block 260 optionally obtains user-specific assessment information and/or other specified assessment criteria for use in the assessment. The information determined and obtained in blocks 255 and 260 may be obtained in various manners in various embodiments and situations. For example, the candidate travel options determined in block 255 may, in at least some embodiments, be the candidate travel options from block 240, such as if the request received in block 205 was to determine travel options and to assess them and to provide corresponding information to the requester. In other embodiments, one or more candidate travel options may have been previously known to the requester (e.g., based on a prior invocation of routines 200 or 300, based on personal knowledge of an associated user, etc.) and supplied as part of the request received in block 205, with the request being to assess those candidate travel options with respect to conditions that are currently affecting travel or that are expected to affect travel at an indicated future time—as discussed in greater detail elsewhere, such assessment of known candidate travel options may be of use in a variety of situations, including for a user who engages in repeated trips between particular starting and destination locations. In addition, in a manner similar to that previously described with respect to block 230, the user-specific assessment information and/or specified assessment criteria may be determined and obtained in various manners, such as based on information previously specified by a particular user associated with the received request and/or that are automatically determined with respect to such a particular user (e.g., based on an analysis of previous travel patterns or other associated information for the user), based on being supplied as part of the request received in block 205, and/or based on a prior configuration of the routine 200 (whether as defaults that may be overridden, or as criteria that are to be used for some or all users and some or all candidate travel options to be assessed).

After block 260, the routine continues to block 265 to generate and aggregate one or more determined assessments for each of the candidate travel options. In particular, in the illustrated embodiment, the routine in block 265 invokes a Travel Option Assessor routine for each candidate travel option, receives one or more determined assessments of that candidate travel option, and aggregates the received results across the various candidate travel options. One example embodiment of such a Travel Option Assessor routine is discussed in greater detail with respect to FIG. 4. While the Travel Option Assessor routine is invoked individually for each candidate travel option in the illustrated embodiment, it will be appreciated that in other embodiments the information determined and obtained in blocks 255 and 260 may instead be supplied to an analogous routine that then generates one or more assessments for some or all of those candidate travel options. After block 265, the routine continues to block 270 to select, if two or more candidate travel options were determined in block 255, one or more of those candidate travel options as preferred options based on the received determined assessments. In other embodiments, a selection of a subset of determined travel options as candidates in block 240 and/or a selection of a subset of candidate travel options as preferred in block 270 may not be performed, such as if information about all determined travel options and all assessments may instead be provided to a requester (e.g., in an ordered or ranked manner) to enable the requester to make further use of the various options and assessments as desired.

After block 270, or if it was instead determined in block 250 that the request or information received in block 205 was not to assess travel options, the routine continues instead to block 280 to determine whether a request was received in block 205 to provide one or more indicated types of travel option information. If so, the routine continues to block 285 to provide the requested information to the requester. In at least some embodiments and situations, the request may be to provide information that was determined and/or selected with respect to one or more of blocks 235, 240, 265 and 270, such as to provide information to the requester that is determined, assessed, and/or selected during a current execution pass through the routine 200. In other embodiments, the request for information may correspond to previously generated information and/or stored information, such as to retrieve historical data, historical determined travel options, historical generated assessments of travel options, etc. As one illustrative example, the routine 200 may in some embodiments be configured to perform determinations of travel options and/or to generate assessments of travel options repeatedly for particular starting and destination location pairs and/or associated times and/or users, to enable a requester to quickly obtain information about a recent determination and/or assessment of such information.

If it is instead determined in block 280 that the request or information received in block 205 is not a request to provide travel option information, the routine continues instead to block 290 to perform one or more other indicated operations as appropriate. Such other operations may have various forms in various embodiments and situations, including to configure information about specified travel option constraints and/or specified assessment criteria for later use (whether with respect to a particular user or for some or all users), to analyze travel patterns or other information with respect to a particular user in order to determine user-specific information for later use (including in some embodiments to automatically determine to schedule and perform determinations of travel options and/or assessments of one or more candidate travel options for a particular user at one or more particular times in the future, such as to correspond to repeated travel performed by the user), to make requests to other systems for current or historical data for use in determining travel options and/or assessing candidate travel options (with responses to such requests optionally received and stored with respect to block 215), etc. After blocks 285 or 290, the routine continues to block 292 to optionally store information about some or all determined candidate travel options and/or generated travel option assessments produced with respect to blocks 235, 240, 265 and/or 270, and/or to provide some or all such information to one or more other recipients (e.g., based on prior requests for such information by such recipients).

After block 292, the routine continues to block 295 to determine whether to continue, such as to continue until an explicit indication to terminate is received. If it is determined to continue, the routine returns to block 205, and if not continues to block 299 and ends.

FIG. 3 is an example flow diagram of an illustrated embodiment of a Travel Option Determiner routine 300. The routine may be provided by, for example, execution of an embodiment of the Travel Option Determiner module 164 of FIG. 1, such as to determine one or more inter-modal travel options corresponding to travel between a starting location and a destination location, optionally in accordance with an associated time and/or one or more other constraints. The routine 300 may be invoked in various manners in various embodiments, including with respect to block 235 of FIG. 2A. While the illustrated embodiment of the routine serially performs determinations of travel options with respect to a single starting location, single destination location, and a single associated time, it will be appreciated that in other embodiments the routine or another analogous routine may instead operate in other manners, such as to simultaneously determine inter-modal travel options corresponding to multiple possible starting locations, destination locations, and/or associated times for a single trip or other potential travel, to simultaneously determine inter-modal travel options corresponding to multiple distinct trips, etc. The routine 300 may be performed, for example, based on use of software instructions of an embodiment of the Travel Option Determiner module, such as when executed by one or more processors of one or more computing systems to configure those processors and those computing systems to perform the routine.

The illustrated embodiment of routine 300 begins at block 305, where a request or information is received. The routine then continues to block 310 to determine whether a request is received to determine one or more inter-modal travel options. If so, the routine continues to block 315 to retrieve information about a starting location, destination location, associated time, and optionally additional information to use (e.g., an indication of an associated user, an indication of constraint information, etc.), such as may be received in whole or in part in block 305. Alternatively, in some embodiments, one or more of these types of information may instead be determined in other manners, such as to use a current location of an indicated user if that information is available and no other starting location is indicated, to use other information associated with an indicated user to determine a particular destination location (e.g., based on an appointment or other schedule of a user showing the user being at a particular location in the near future, based on analyzed historical travel patterns of the user indicating a likely destination location in the near future, etc.), to use a current time if no other associated time is indicated, etc. In addition, rather than being specified in block 305, the optional constraint information may be retrieved based on accessing user-specific information associated with an indicated user, by using default information specified or configured for use with the routine 300, etc. —in other embodiments, the only constraint information used may be that associated with physical constraints on travel (e.g., a person has to arrive at a location before they can depart from it, based on upper limits associated with how fast travel can occur given a particular travel mode, etc.).

After block 315, the routine continues to block 320 to obtain information corresponding to the potential use of multiple travel modes for determining the inter-modal travel options. As discussed in greater detail elsewhere, such information may be of various types, including user-specific information (e.g., based on what type of motorized or other vehicles, if any, are available to the user; based on user limits corresponding to use of particular travel modes, such as whether and how far the user can walk; etc.), and may be obtained in various manners, as discussed in greater detail previously with respect to block 215 of FIG. 2A and elsewhere. For example, a non-exclusive list of such types of information may include, for a given mass transit travel mode, indications of one or more locations that are access points for the user to embark and/or to disembark from that particular mass transit travel mode, such as embarkation points near the starting location, debarkation points near the destination location, and/or embarkation or debarkation points at intermediate locations between the starting location and destination location that may serve as access points from changing between that travel mode and one or more other travel modes (or between different instances of a particular travel mode, such as different buses, trains, boats, etc.).

After block 320, the routine continues to block 325 to determine one or more routes that are travel options between the starting location and destination location for the indicated time and in accordance with an constraint information being used, based at least in part on the information obtained in block 320. In particular, in the illustrated embodiment, each travel mode that is possibly available is considered, and an attempt is made to determine one or more route options between the starting and destination locations for the indicated time that use that travel mode for some or all of the route. Using a particular bus route as an example, the routine may attempt to determine an embarkation point for that bus route that is closest to the starting location, determine a debarkation point for that bus route that is closest to the destination location, and then consider the use of one or more other travel modes for travel between the starting location and the embarkation point and/or between the debarkation point and the destination location, such as walking, bicycling (if bicycles are able to be transported via the bus), a private vehicle (if parking is available near the embarkation and/or debarkation points), etc. In addition, with respect to that same bus route, one or more other embarkation points and/or debarkation points along the bus route may be considered as part of one or more alternative determined travel options, such as to have a first travel option in which a user walks from a starting location to a nearby bus route embarkation point, and to have a second travel option that includes the user driving from the starting location to a farther bus route embarkation point (e.g., a farther embarkation point that has an associated park-and-ride facility or other parking available). Similarly, with respect to that same bus route, one or more other embarkation times along the bus route (corresponding to different possible buses traveling on that bus route) may be considered as part of one or more further alternative determined travel options, such as if different arrival times at intermediate locations along the route provide different options with respect to switching to a different travel mode (including a different bus route) for an additional portion of the route.

In addition, a second bus route may be treated as part of a distinct second travel mode for the same user, whether with the same or different embarkation and/or debarkation points, and with the same or other optional additional travel modes to complete the route(s). Additional details are included elsewhere related to using routing algorithms to determine travel options between starting and destination locations with respect to specified constraints, and travel options may be determined in other embodiments in other manners without using such routing algorithms (e.g., based on using predetermined travel options between popular or repeatedly used starting and destination locations). In addition, in embodiments in which one or more travel options have previously been determined with respect to the same starting location, destination location and indicated time, or with respect to other locations and/or times that are analogous or similar (e.g., for nearby locations), information about the determined travel options from those previous determinations may be obtained and used, such as without modification, or instead as a starting point for use in modifying one or more such previously determined travel options in order to determine current travel options for the current situation.

After block 325, the routine continues to block 330 to optionally remove one or more of the route options determined in block 325 from further consideration, such as if one or more route options are determined to be preferred over other similar travel options, in accordance with any specified user preference information (e.g., to only use a travel option that includes a bus if there are no available travel options including a train), etc. As one example, if a first determined travel option involves an embarkation point on a bus route that is closest to the starting location, and another travel option involves a next embarkation point along the bus route that is farther from the starting location and that does not differ with respect to other travel modes (e.g., if the user would have to walk five minutes to get to the first embarkation point and ten minutes to get to the second embarkation point), the second determined travel option may be removed based on the first travel option being preferred in at least some such situations—in other embodiments, the second travel option in such a situation may instead not even be generated in block 325 as a possible option, the operations of block 330 may not be performed, etc. After block 330, the routine continues to block 335 to provide a response to the received request that includes any remaining route options from block 325 as the determined travel options, with at least one determined travel option being provided unless no options are identified as being possible for travel between the determined starting location and destination location in light of the indicated time and any other indicated constraints.

If it was instead determined in block 310 that the request or information received in block 305 was not a request to determine travel options, the routine continues instead to block 390 to perform one or more other indicated operations as appropriate. Such other indicated operations may have various forms in various embodiments and situations, including to receive and respond to a request for previously determined travel option information, to schedule a future performance of determining travel options using specified information (e.g., for a particular user), to receive and store user-specific information related to constraints or other preferences for future use, etc.

After blocks 335 or 390, the routine continues to block 395 to determine whether to continue, such as until an explicit indication to terminate is received. If it is determined to continue, the routine returns to block 305, and otherwise continues to block 399 and ends.

FIG. 4 is an example flow diagram of an illustrated embodiment of a Travel Option Assessor routine 400. The routine may be provided by, for example, execution of an embodiment of the Travel Option Assessor module 166 of FIG. 1, such as to receive information about one or more candidate travel options and to assess them with respect to one or more evaluation criteria, such as enable cost-based comparisons between different candidate travel options (e.g., with respect to one or more of monetary cost, time delay cost, etc.), or to otherwise enable a particular candidate travel option to be assessed (e.g., based on a comparison to normal or typical, based on an assessed value with respect to a particular evaluation criteria such as cost or time, etc.). The routine 400 may be invoked in various manners in various embodiments, including with respect to block 265 of FIG. 2B. In addition, in the illustrated embodiment, the routine receives an indication of a particular candidate travel option and assesses it with respect to one or more evaluation criteria, although in other embodiments the routine may instead receive multiple candidate travel options and assess them simultaneously with respect to the same or different one or more evaluation criteria. The routine 400 may be performed, for example, based on use of software instructions of an embodiment of the Travel Option Assessor module, such as when executed by one or more processors of one or more computing systems to configure those processors and those computing systems to perform the routine.

The illustrated embodiment of routine 400 begins at block 405, where a request or information is received. The routine continues to block 410 to determine if a request is received to assess a travel option. If so, the routine continues to block 415 to receive information about a particular candidate travel option for travel from a starting location to a destination location at an indicated time using one or more travel modes for one or more portions of the corresponding travel, and optionally one or more types of additional information (e.g., an indication of an associated user, one or more specified evaluation criteria). The candidate travel option information may be received in various manners, such as to be supplied in block 405 in the illustrated embodiment, or instead to be retrieved in other manners in other embodiments, such as to retrieve a previously determined candidate travel option that is associated with an indicated user (e.g., based on the user having used or considered that travel option one or more previous times), to retrieve one or more evaluation criteria associated with an indicated user, to retrieve default evaluation criteria configured for use by the routine, etc. In some embodiments, the information may be received in block 405 from initiation of a scheduled analysis of the indicated candidate travel option that is performed repeatedly (e.g., each weekday for a candidate travel option corresponding to a repeated commute from home to work), or as may have been otherwise previously scheduled, etc. In addition, when multiple evaluation criteria are specified, the evaluation criteria may in some situations be alternatives (e.g., monetary cost as one evaluation criterion, and amount of time as a separate distinct evaluation criterion), while in other embodiments two or more criteria may be specified for use together (e.g., to identify the fastest travel option that has a monetary cost below a specified threshold; to identify the cheapest travel option whose travel time does not exceed a specified threshold; to identify the highest rated travel option based on it having the lowest associated cost, and in which each minute longer than the length of time for the fastest travel option corresponds to an assessed additional one dollar monetary cost; etc.).

After block 415, the routine continues to block 420 to obtain information corresponding to particular travel modes for use in evaluating the candidate travel option. As discussed in greater detail elsewhere, such evaluation-related information may be of various types, including with respect to costs and/or times associated with use of particular travel modes, and may be obtained in various manners, as discussed in greater detail previously with respect to block 215 of FIG. 2A and elsewhere. For example, a non-exclusive list of such types of information may include indications of one or more fares for a given mass transit travel mode, of actual or expected traffic conditions for particular roads and/or road lanes, of scheduled or actual or expected arrival times for a particular mass transit vehicle and/or of transit times associated with use of a particular mass transit vehicle between embarkation and debarkation locations, of parking availability (and optionally associated wait times) for particular parking locations, of fees associated with use of particular parking locations and roads and road lanes, of travel times associated with particular travel modes (e.g., based on walking speed, cycling speed, private vehicle driving speed for a particular road or road type, etc., optionally in a manner specific to a particular user), etc.

After block 420, the routine continues to block 425 to generate one or more assessments for the candidate travel option based on the evaluation criteria. In block 430, the routine then continues to optionally remove one or more of the generated assessments in light of other assessments, such as if the other assessments are preferred (e.g., to remove an assessment based on the amount of delay time corresponding to switching between multiple travel modes for the candidate travel option, if the candidate travel option does not include such delay). In other embodiments, such removal of generated assessments is not performed in this manner, and any generated assessment information is instead provided to the requester for analysis (e.g., in light of the generated assessments of other candidate travel options, if any). After block 430, the routine continues to block 435 to provide a response to the requester, with any remaining generated assessments for the candidate travel option being treated as the determined travel option assessments for the candidate travel option.

If it is instead determined in block 410 that the request for information received in block 405 is not a request to generate assessments for a candidate travel option, the routine continues instead to block 490 to perform one or more other indicated operations as appropriate. Such other indicated operations may have various forms in various embodiments and situations, including to receive and respond to a request for previously generated travel option assessment information, to schedule a future performance of assessment one or more travel options (e.g., for a particular user, using specified evaluation criteria, etc.), to receive and store user-specific information related to evaluation criteria or other preferences for future use, etc.

After blocks 435 or 490, the routine continues to block 495 to determine whether to continue, such as until an explicit indication to terminate is received. If it is determined to continue, the routine returns to block 405, and otherwise continues to block 499 and ends.

In addition, various embodiments provide various mechanisms for users and other clients to interact with the IMTOA system and/or one or more of the modules of the systems (e.g., the Travel Option Determiner module 164, the Travel Option Assessor module 166 and/or the Information Supplier module 168 of FIG. 1). For example, some embodiments may provide an interactive console (e.g. a client program providing an interactive user interface, a Web browser-based interface, etc.) from which clients can make requests and receive corresponding responses, such as requests to analyze, select, and/or provide information related to one or more inter-modal travel options or other travel options for a particular trip. Some embodiments may provide an API ("Application Programming Interface") that allows client computing systems to programmatically make some or all such requests, such as via network message protocols (e.g., Web services) and/or other communication mechanisms.

Additional details related to filtering, conditioning, aggregating and predicting information about road conditions are available in pending U.S. patent application Ser. No. 11/473,861, filed Jun. 22, 2006 and entitled "Obtaining Road Traffic Condition Data From Mobile Data Sources;" in pending U.S. application Ser. No. 11/367,463, filed Mar. 3, 2006 and entitled "Dynamic Time Series Prediction of Future Traffic Conditions;" and in pending U.S. application Ser. No. 11/835,357, filed Aug. 7, 2007 and entitled "Representative Road Traffic Flow Information Based On Historical Data;" each of which is hereby incorporated by reference in its entirety.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

A non-exclusive list of possible embodiments that are contemplated are indicated in the following clauses:

1. A computer-implemented method comprising:

receiving, by one or more configured computing systems of an inter-modal travel option assessment system, information from a user about a starting location and a destination location in a geographic area and an indicated time corresponding to the user traveling from the starting location to the destination location;

determining, by the one or more configured computing systems, multiple alternative travel options for the user to travel from the starting location to the destination location at the indicated time, the multiple alternative travel options each using a distinct combination of two or more modes of transportation from multiple available modes of transportation in the geographic area, wherein the multiple modes of transportation include one or more mass transit systems in the geographic area and include use of a private vehicle of the user traveling on one or more roads in the geographic area, and wherein at least one of the multiple alternative travel options uses a combination that includes at least one of the mass transit systems for a subset of the travel and that includes the use of the private vehicle of the user for another subset of the travel;

obtaining, by the one or more configured computing systems, road traffic information about traffic conditions on the one or more roads at an indicated time, the obtained road traffic information corresponding to actual traffic conditions if the indicated time is a current time and corresponding to expected traffic conditions if the indicated time is a future time;

obtaining, by the one or more configured computing systems, schedule information for the one or more mass transit systems;

obtaining, by the one or more configured computing systems, monetary cost information associated with using each of the multiple modes of transportation;

assessing, by the one or more configured computing systems, monetary costs associated with using each of the multiple alternative travel options to travel from the starting location to the destination location at the indicated time, the assessed costs for the multiple alternative travel options being based at least in part on the obtained monetary cost information;

assessing, by the one or more configured computing systems, travel times associated with using each of the multiple alternative travel options to travel from the starting location to the destination location at the indicated time, the assessed travel times for the multiple alternative travel options being based at least in part on the obtained schedule information and on the obtained road traffic information; and providing information to the user about one or more of the multiple alternative travel options that indicates the assessed monetary costs and the assessed travel times for the one or more alternative travel options, to enable the user to use one of the one or more alternative travel options to travel at the indicated time from the starting location to the destination location.

2. The method of clause 1 further comprising:

determining, by the one or more configured computing systems, one or more additional alternative travel options for the user to travel from the starting location to the destination location at the indicated time, the one or more additional alternative travel options each using a single one of the multiple available modes of transportation;

assessing, by the one or more configured computing systems, monetary costs associated with using each of the one or more additional alternative travel options to travel from the starting location to the destination location at the indicated time; and assessing, by the one or more configured computing systems, travel times associated with using each of the one or more additional alternative travel options to travel from the starting location to the destination location at the indicated time, and wherein the providing of the information to the user about the one or more alternative travel options includes providing additional information to the user about at least one of the one or more additional alternative travel options that indicates the assessed monetary costs and the assessed travel times for the at least one additional alternative travel option.

3. The method of clause 2 wherein the at least one mass transit system uses vehicles that do not travel on any roads in the geographic area, and wherein the one or more alternative travel options for which information is provided to the user include the at least one alternative travel option that uses the combination including the at least one mode of transportation involving vehicles traveling on the one or more roads and that includes the at least one mass transit systems using vehicles that do not travel on any roads in the geographic area.

4. The method of clause 2 wherein the obtained schedule information for the one or more mass transit systems includes scheduled arrival times for mass transit vehicles at one or more transit embarkation locations, and wherein the further comprises:

obtaining, by the one or more configured computing systems, transit vehicle deviation information that indicates differences between the scheduled arrival times for the mass transit vehicles and actual arrival times for the mass transit vehicles at the one or more transit embarkation locations, the obtained transit vehicle deviation information corresponding to actual transit vehicle deviations if the indicated time is a current time and corresponding to expected transit vehicle deviations if the indicated time is a future time; and obtaining, by the one or more configured computing systems, parking availability information about availability of parking at one or more locations for the user to park the private vehicle of the user, the obtained parking availability information corresponding to actual parking availability if the indicated time is a current time and corresponding to expected parking availability if the indicated time is a future time, and wherein the assessing of the monetary costs and of the travel times associated with using the multiple alternative travel options is further based in part on the obtained transit vehicle deviation information and the obtained parking availability information.

5. A computer-implemented method comprising:

receiving information about a starting location and a destination location in a geographic area;

determining, by one or more configured computing systems, multiple alternative travel options for a user to travel from the starting location to the destination location, the multiple alternative travel options each using a distinct combination of one or more modes of transportation from multiple available modes of transportation, at least one of the multiple modes of transportation involving vehicles traveling on one or more roads in the geographic area;

obtaining, by the one or more configured computing systems, information about traffic conditions on the one or more roads at an indicated time;

assessing, by the one or more configured computing systems, costs associated with using each of the multiple alternative travel options to travel from the starting location to the destination location at the indicated time, the assessed costs being based at least in part on the obtained information about the traffic conditions; and providing information about one or more of the multiple alternative travel options in a manner that reflects the assessed costs, to enable the user to use one of the multiple alternative travel options to travel at the indicated time from the starting location to the destination location.

6. The method of clause 5 wherein the one or more alternative travel options include a first alternative travel option that uses a combination of at least one mass transit system in the geographic area for a subset of the travel for the first alternative travel option and that includes the use of a private vehicle of the user on the one or more roads for another subset of the travel for the first alternative travel option.

7. The method of clause 6 wherein the one or more alternative travel options further include a second alternative travel option that uses only the private vehicle of the user on the one or more roads for the travel for the second alternative travel option.

8. The method of clause 6 wherein the one or more alternative travel options further include a second alternative travel option that uses at least two distinct mass transit systems in the geographic area for the travel for the second alternative travel option.

9. The method of clause 6 wherein the one or more alternative travel options further include a second alternative travel option that uses a distinct second combination of a second mass transit system in the geographic area for a subset of the travel for the second alternative travel option and that includes the use of a private vehicle of the user on the one or more roads for another subset of the travel for the second alternative travel option, wherein the second mass transit system is not part of the at least one mass transit system used for the first alternative travel option.

10. The method of clause 6 wherein the one or more alternative travel options further include a second alternative travel option that uses a distinct second combination of one or more mass transit systems in the geographic area without any use of the private vehicle of the user for the travel for the second alternative travel option.

11. The method of clause 6 wherein the at least one mass transit system in the geographic area uses the one or more roads for at least some of the travel for the first alternative travel option.

12. The method of clause 6 wherein the at least one mass transit system in the geographic area does not use the one or more roads for the travel for the first alternative travel option.

13. The method of clause 5 further comprising:
obtaining, by the one or more configured computing systems, monetary cost information associated with using the multiple available modes of transportation,
and wherein the assessing of the costs associated with using each of the multiple alternative travel options includes assessing one or more monetary costs for each of the one or more alternative travel options based at least in part on the obtained monetary cost information.

14. The method of clause 13 further comprising obtaining, by the one or more configured computing systems, parking cost information about cost of parking at one or more locations for the user to park a private vehicle of the user,
and wherein the assessing of the one or more monetary costs for each of the one or more alternative travel options includes using the obtained parking cost information as part of the assessing of the one or more monetary costs for at least one of the one or more alternative travel options.

15. The method of clause 5 wherein the obtaining of the information about the traffic conditions further includes obtaining additional travel time information associated with using the multiple available modes of transportation, and wherein the assessing of the costs associated with using each of the multiple alternative travel options includes assessing one or more travel time costs for each of the one or more alternative travel options based at least in part on the obtained information about the traffic conditions and on the obtained additional travel time information.

16. The method of clause 15 wherein the multiple available modes of transportation include one or more mass transit systems operating in the geographic area, and wherein the obtained additional travel time information includes schedule information for at least one of the mass transit systems that indicates scheduled arrival time of transit vehicles at one or more transit embarkation locations.

17. The method of clause 16 further comprising:
obtaining, by the one or more configured computing systems, transit vehicle deviation information that indicates differences between the scheduled arrival times for the transit vehicles and actual arrival times for the transit vehicles at the one or more transit embarkation locations, the obtained transit vehicle deviation information corresponding to actual transit vehicle deviations if the indicated time is a current time and corresponding to expected transit vehicle deviations if the indicated time is a future time,
and wherein the assessing of the one or more travel time costs for each of the one or more alternative travel options includes using the obtained transit vehicle deviation information as part of the assessing of the one or more travel time costs for at least one of the one or more alternative travel options.

18. The method of clause 15 further comprising obtaining, by the one or more configured computing systems, parking availability information about availability of parking at one or more locations for the user to park a private vehicle of the user, the obtained parking availability information corresponding to actual parking availability if the indicated time is a current time and corresponding to expected parking availability if the indicated time is a future time,
and wherein the assessing of the one or more travel time costs for each of the one or more alternative travel options includes using the obtained parking availability information as part of the assessing of the one or more travel time costs for at least one of the one or more alternative travel options.

19. The method of clause 15 wherein the obtaining of the information about the traffic conditions includes obtaining road traffic information corresponding to actual traffic conditions if the indicated time is a current time and obtaining road traffic information corresponding to expected traffic conditions if the indicated time is a future time.

20. The method of clause 5 wherein the assessing of the costs associated with using each of the multiple alternative travel options to travel from the starting location to the destination location at the indicated time is performed for each of multiple indicated times, wherein the multiple indicated times include a current time and include one or more future times, wherein the obtaining of the information about the traffic conditions includes obtaining actual traffic condition information for the current time and obtaining expected traffic condition information for each of the one or more future times, wherein the assessing of the costs for the current time includes using the obtained actual traffic condition information for the current time, and wherein the assessing of the costs for the one or more future times includes using the obtained expected traffic condition information for the one or more future times.

21. The method of clause 5 further comprising obtaining, by the one or more configured computing systems, information specific to the user related to constraints on travel options that may be used, and wherein the determining of the multiple alternative travel options for the user includes removing at least one other travel option as a candidate based at least in part on the obtained information specific to the user.

22. The method of clause 5 further comprising obtaining, by the one or more configured computing systems, information specific to the user related to one or more assessment criteria for travel options, and wherein the assessing of the costs associated with using each of the multiple alternative travel options involves using the one or more assessment criteria.

23. The method of clause 5 further comprising obtaining, by the one or more configured computing systems, information specific to the user related to how to perform the providing of the information about the one or more alternative travel options, and wherein the providing of the information about the one or more alternative travel options is performed in accordance with the obtained information specific to the user.

24. The method of clause 5 further comprising selecting, by the one or more configured computing systems, at least one of the multiple alternative travel options based at least in part on one or more specified evaluation criteria corresponding to the assessed costs and not selecting at least one other of the multiple alternative travel options, and wherein the providing of the information about the one or more alternative travel options includes providing information only for the selected at least one alternative travel option.

25. The method of clause 5 wherein the determining of the multiple alternative travel options for the user to travel from the starting location to the destination location is performed for each of multiple indicated times, wherein the determined multiple alternative travel options differ between a first of the multiple indicated times and a second of the multiple indicated times, wherein the assessing of the costs associated with using each of the multiple alternative travel options is performed for at least a first alternative travel option at the first time and for a second alternative travel option at the same time that is not part of the determined multiple alternative travel options for the first time, and wherein the providing of the information about the one or more alternative travel options includes providing information for each of the first and second alternative travel options.

26. The method of clause 5 wherein the one or more configured computing systems are part of an automated inter-modal travel option assessment system that assess travel options for each of multiple users, and wherein the providing of the information about the one or more alternative travel options includes sending information from the one or more configured computing systems to a computing device associated with the user to enable corresponding information to be presented to the user via the associated computing device.

27. The method of clause 5 wherein the one or more configured computing systems include a mobile device associated with the user, and wherein the providing of the information about the one or more alternative travel options includes initiating presentation of corresponding information to the user.

28. The method of clause 5 wherein the obtaining of the information about the traffic conditions on the one or more roads at an indicated time includes obtaining a plurality of data samples associated with a plurality of vehicles traveling on the one or more roads in the geographic area, wherein each data sample indicates an associated road location at a specified time.

29. A non-transitory computer-readable storage medium having stored contents that configure a computing device to perform a method, the method comprising:

obtaining, by the configured computing device, information about traffic conditions on one or more roads at an indicated time;

assessing, by the configured computing device, multiple alternative travel options for a user to travel from a starting location to a destination location using one or more modes of transportation from multiple available modes of transportation, the assessing being performed with respect to one or more defined evaluation criteria and being based at least in part on the obtained information about the traffic conditions at the indicated time; and providing information about one or more of the multiple alternative travel options in a manner that reflects the assessing.

30. The non-transitory computer-readable storage medium of clause 29 wherein the method further comprises, before the assessing of the multiple alternative travel options for the user:

receiving a request associated with the user that indicates the starting location and the destination location; and determining, by the configured computing device, the multiple alternative travel options in response to the received request, and wherein the providing of the information about the one or more alternative travel options is further performed in response to the received request.

31. The non-transitory computer-readable storage medium of clause 29 wherein the method further comprises, before the assessing of the multiple alternative travel options for the user:

receiving an indication of the starting location and the destination location; and retrieving, by the configured computing device, at least some of the multiple alternative travel options in response to the received request, the retrieved at least some alternative travel options having been previously determined for the user.

32. The non-transitory computer-readable storage medium of clause 29 wherein the assessing of the multiple alternative travel options for the user further includes assessing costs associated with using each of the multiple alternative travel options to travel from the starting location to the destination location at the indicated time, wherein the configured computing device is part of an inter-modal travel option assessment system, wherein the computer-readable storage medium is a memory of the configured computing device, and wherein the stored contents include software instructions that, when executed, program the configured computing device to perform the method.

32B. The non-transitory computer-readable storage medium of clause 29 wherein the stored contents include executable software instructions of a software program, and wherein the configured computing device is further configured to perform the method of any of clauses 1-28.

33. A configured system, comprising:

one or more processors of one or more computing devices; and one or more modules that are configured to, when executed by at least one of the one or more processors, assess travel options for one or more users by, for each of the one or more users:

determining one or more alternative travel options for the user to travel from a starting location to a destination location at an indicated time, at least one of the alternative travel options using a combination of multiple available modes of transportation, at least one of the multiple modes of transportation involving vehicles traveling on one or more roads;

obtaining information about traffic conditions on the one or more roads for the indicated time;

assessing the one or more alternative travel options for the user based on one or more defined evaluation criteria and based at least in part on the obtained information about the traffic conditions at the indicated time; and providing information for the user about the one or more alternative travel options in a manner that reflects the assessing.

34. The system of clause 33 wherein, for one of the one or more users, the determining of the one or more alternative travel options for the one user includes determining multiple alternative travel options.

35. The system of clause 34 wherein the determined multiple alternative travel options for the one user include the at least one travel option for the one user and include at least one additional travel option for the one user that uses a single mode of transportation.

36. The system of clause 33 wherein, for one of the one or more users, the assessing of the one or more alternative travel options for the one user further includes assessing costs associated with using each of the one or more alternative travel options at each of multiple indicated times, wherein the multiple indicated times include a current time and include one or more future times, wherein the obtaining of the information about the traffic conditions includes obtaining actual traffic condition information for the current time and obtaining expected traffic condition information for each of the one or more future times, wherein the assessing of the costs for the current time includes using the obtained actual traffic condition information for the current time, and wherein the assessing of the costs for the one or more future times includes using the obtained expected traffic condition information for the one or more future times.

37. The system of clause 33 wherein the one or more modules are part of an inter-modal travel option assessment system and include at least a travel option determiner module and a travel option assessor module, and wherein the one or more modules include software instructions for execution by the one or more processors.

38. The system of clause 33 wherein the one or more modules consist of one or more means for performing the assessing of the travel options for the one or more users.

38B. The system of clause 33 wherein the one or more modules include executable software instructions of a software program, and wherein the one or more modules are further configured to perform the method of any of clauses 1-28.

38C. The system of clause 33 wherein the one or more modules include executable software instructions of a software program, and wherein the one or more modules are further configured to perform the method specified for any of clauses 29-32.

39. A computer-implemented method comprising:

providing, by a configured computing device associated with a user, a request to an inter-modal travel option assessment system for assessment of one or more options for the user to travel from a starting location to a destination location in a geographic area using one or more of multiple available modes of transportation in the geographic area;

receiving, by the configured computing device and in response to the provided request, assessment information for one or more of multiple determined alternative travel options for the user to travel from the starting location to the destination location at one or more indicated times, the multiple alternative travel options each using a distinct combination of one or more of the multiple available modes of transportation, at least one of the multiple modes of transportation involving vehicles traveling on one or more roads in the geographic area, the received assessment information indicating assessed costs for the one or more alternative travel options that are based at least in part on information about traffic conditions on the one or more roads at the one or more indicated times; and using, by the configured computing device, the received assessment information to enable the user to use one of the multiple determined alternative travel options to travel at one of the indicated times from the starting location to the destination location.

40. The method of clause 39 wherein the using of the received assessment information by the configured computing devices includes at least one of presenting routing information to the user for the one determined alternative travel option and of presenting at least some of the received assessment information to the user to enable selection by the user of the one determined alternative travel option.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:

receiving information about a starting location and a destination location in a geographic area;

determining, by one or more configured computing systems, multiple alternative travel options for a user to travel from the starting location to the destination location at a future time, the multiple alternative travel options each using a distinct combination of one or more modes of transportation from multiple available modes of transportation, wherein one of the multiple modes of transportation involves a private vehicle of the user traveling on one or more roads in the geographic area, wherein another of the multiple modes of transportation includes a mass transit system operating in the geographic area, and wherein the multiple alternative travel options include at least one travel option using the private vehicle of the user and at least one travel option using the mass transit system;

obtaining, by the one or more configured computing systems, information about traffic conditions on the one or more roads at the future time by predicting at a current time the traffic conditions on the one or more roads at the future time;

obtaining, by the one or more configured computing systems, transit vehicle deviation information that indicates expected differences at the future time between scheduled and actual arrival times for transit vehicles of the mass transit system at one or more transit embarkation locations, the obtaining of the transit vehicle deviation information including predicting at the current time the expected differences at the future time between the scheduled and actual arrival times;

assessing, by the one or more configured computing systems, costs associated with using each of the multiple alternative travel options to travel from the starting location to the destination location at the future time, the assessed costs being based at least in part on the obtained information about the traffic conditions and on the obtained transit vehicle deviation information; and providing information about one or more of the multiple alternative travel options in a manner that reflects the assessed costs, to enable the user to use one of the multiple alternative travel options to travel at the future time from the starting location to the destination location.

2. The method of claim 1 wherein the one or more alternative travel options include a first alternative travel option that uses a combination of the mass transit system in the geographic area for a subset of the travel for the first alternative travel option and that includes the use of the private vehicle of the user on the one or more roads for another subset of the travel for the first alternative travel option.

3. The method of claim 2 wherein the one or more alternative travel options further include a second alternative travel option that uses only the private vehicle of the user on the one or more roads for the travel for the second alternative travel option.

4. The method of claim 2 wherein the one or more alternative travel options further include a second alternative travel option that uses at least two distinct mass transit systems in the geographic area for the travel for the second alternative travel option.

5. The method of claim 2 wherein the one or more alternative travel options further include a second alternative travel option that uses a distinct second combination of a second mass transit system in the geographic area for a subset of the travel for the second alternative travel option and that includes the use of the private vehicle of the user on the one or more roads for another subset of the travel for the second alternative travel option.

6. The method of claim 2 wherein the one or more alternative travel options further include a second alternative travel option that uses a distinct second combination of one or more mass transit systems in the geographic area without any use of the private vehicle of the user for the travel for the second alternative travel option.

7. The method of claim 2 wherein the mass transit system in the geographic area uses the one or more roads for at least some of the travel for the first alternative travel option, and wherein the assessing of the costs for the at least one travel option using the mass transit system includes using the obtained information about the traffic conditions and the obtained transit vehicle deviation information.

8. The method of claim 2 wherein the mass transit system in the geographic area does not use the one or more roads for the travel for the first alternative travel option, and wherein the assessing of the costs for the at least one travel option using the mass transit system includes using the obtained transit vehicle deviation information without using the obtained information about the traffic conditions.

9. The method of claim 1 further comprising:
obtaining, by the one or more configured computing systems, monetary cost information associated with using the multiple available modes of transportation, and wherein the assessing of the costs associated with using each of the multiple alternative travel options includes assessing one or more monetary costs for each of the one or more alternative travel options based at least in part on the obtained monetary cost information.

10. The method of claim 9 further comprising obtaining, by the one or more configured computing systems, parking cost information about cost of parking at one or more locations for the user to park a private vehicle of the user, and wherein the assessing of the one or more monetary costs for each of the one or more alternative travel options includes using the obtained parking cost information as part of the assessing of the one or more monetary costs for at least one of the one or more alternative travel options.

11. The method of claim 1 wherein the obtaining of the information about the traffic conditions further includes obtaining additional travel time information associated with using the multiple available modes of transportation, and wherein the assessing of the costs for the multiple alternative travel options includes assessing one or more travel time costs for each of the one or more alternative travel options based at least in part on the obtained information about the traffic conditions and on the obtained additional travel time information and on the obtained transit vehicle deviation information.

12. The method of claim 11 wherein the obtained additional travel time information includes schedule information for the mass transit system that indicates scheduled arrival time of transit vehicles at transit embarkation locations.

13. The method of claim 12 further comprising:
obtaining, by the one or more configured computing systems, actual transit vehicle deviation information for the current time that indicates differences between the scheduled arrival times for the transit vehicles and actual arrival times for the transit vehicles at the transit embarkation locations;
determining, by one or more configured computing systems, an additional alternative travel option for the user to travel from the starting location to the destination location at the current time that includes using the mass transit system; and
assessing, by the one or more configured computing systems, a cost associated with using the additional alternative travel option based at least in part on the obtained actual transit vehicle deviation information for the current time,
and wherein the providing of the information about the one or more alternative travel options includes providing information about the additional alternative travel option in a manner that reflects the assessed cost associated with using the additional alternative travel option.

14. The method of claim 11 further comprising obtaining, by the one or more configured computing systems, parking availability information about availability of parking at one or more locations for the user to park a private vehicle of the user, the obtaining of the parking availability information including predicting at the current time expected parking availability at the future time,
and wherein the assessing of the costs for each of the one or more alternative travel options includes using the obtained parking availability information as part of the assessing of the costs for at least one of the one or more alternative travel options.

15. The method of claim 11 further comprising:
obtaining, by the one or more configured computing systems, information about actual traffic conditions at the current time on the one or more roads;
determining, by one or more configured computing systems, an additional alternative travel option for the user to travel from the starting location to the destination location at the current time that includes one or more transportation modes that travel on the one or more roads; and assessing, by the one or more configured computing systems, a cost associated with using the additional alternative travel option based at least in part on the obtained information about the actual travel conditions for the current time, and wherein the providing of the information about the one or more alternative travel options includes providing information about the additional alternative travel option in a manner that reflects the assessed cost associated with using the additional alternative travel option.

16. The method of claim 1 wherein the assessing of the costs associated with using each of the multiple alternative travel options to travel from the starting location to the destination location is performed for each of multiple indicated times, wherein the multiple indicated times include a current time and include one or more future times, wherein the obtaining of the information about the traffic conditions further includes obtaining actual traffic condition information for the current time and obtaining predicted traffic condition information for each of the one or more future times, wherein the obtaining of the transit vehicle deviation information further includes obtaining information about actual differences at the current time between scheduled and actual arrival times for the transit vehicles of the mass transit system at the one or more transit embarkation locations, and wherein the assessing of the costs for the current time includes using the obtained actual traffic condition information for the current time and the obtained information about the actual differences at the current time between the scheduled and actual arrival times for the transit vehicles.

17. The method of claim 1 further comprising obtaining, by the one or more configured computing systems, information specific to the user related to constraints on travel options that may be used, and wherein the determining of the multiple alternative travel options for the user includes removing at least one other travel option as a candidate based at least in part on the obtained information specific to the user.

18. The method of claim 1 further comprising obtaining, by the one or more configured computing systems, information specific to the user related to one or more assessment criteria for travel options, and wherein the assessing of the costs associated with using each of the multiple alternative travel options involves using the one or more assessment criteria.

19. The method of claim 1 further comprising obtaining, by the one or more configured computing systems, information specific to the user related to how to perform the providing of the information about the one or more alternative travel options, and wherein the providing of the information about the one or more alternative travel options is performed in accordance with the obtained information specific to the user.

20. The method of claim 1 further comprising selecting, by the one or more configured computing systems, at least one of the multiple alternative travel options based at least in part on one or more specified evaluation criteria corresponding to the assessed costs and not selecting at least one other of the multiple alternative travel options, and wherein the providing of the information about the one or more alternative travel options includes providing information only for the selected at least one alternative travel option.

21. The method of claim 1 wherein the determining of the multiple alternative travel options for the user to travel from the starting location to the destination location is performed for each of multiple indicated times, wherein the determined multiple alternative travel options differ between a first of the multiple indicated times and a second of the multiple indicated times, wherein the assessing of the costs associated with using each of the multiple alternative travel options is performed for at least a first alternative travel option at the first time and for a second alternative travel option at the second time that is not part of the determined multiple alternative travel options for the first time, and wherein the providing of the information about the one or more alternative travel options includes providing information for each of the first and second alternative travel options.

22. The method of claim 1 wherein the one or more configured computing systems are part of an automated inter-modal travel option assessment system that assesses travel options for each of multiple users, and wherein the providing of the information about the one or more alternative travel options includes sending information from the one or more configured computing systems to a computing device associated with the user to enable corresponding information to be presented to the user via the associated computing device.

23. The method of claim 1 wherein the one or more configured computing systems include a mobile device associated with the user, and wherein the providing of the information about the one or more alternative travel options includes initiating presentation of corresponding information to the user.

24. The method of claim 1 wherein the obtaining of the information about the traffic conditions on the one or more roads at the future time includes obtaining a plurality of data samples associated with a plurality of vehicles traveling on the one or more roads in the geographic area, wherein each data sample indicates an associated road location at a specified time, and wherein the predicting at the current time of the traffic conditions on the one or more roads at the future time is based at least in part on the obtained plurality of data samples.

25. A non-transitory computer-readable storage medium having stored contents that configure a computing device to perform a method, the method comprising:

obtaining, by the configured computing device, information about traffic conditions on one or more roads at an indicated time;

predicting, by the configured computing device, differences between scheduled and actual arrival times corresponding to the indicated time at one or more transit embarkation locations for transit vehicles of a mass transit system operating in a geographic area that includes the one or more roads;

assessing, by the configured computing device, multiple alternative travel options for a user to travel from a starting location to a destination location using one or more modes of transportation from multiple available modes of transportation, wherein at least one of the multiple alternative travel options includes using at least one of the transit embarkation locations of the mass transit system, and wherein the assessing is based at least in part on the obtained information about the traffic conditions at the indicated time and on the predicted differences between the scheduled and actual arrival times at the one or more transit embarkation locations; and providing information about one or more of the multiple alternative travel options in a manner that reflects the assessing, wherein the one or more alternative travel options include the at least one alternative travel option.

26. The non-transitory computer-readable storage medium of claim 25 wherein the method further comprises, before the assessing of the multiple alternative travel options for the user:
receiving a request associated with the user that indicates the starting location and the destination location; and
determining, by the configured computing device, the multiple alternative travel options in response to the received request,
and wherein the providing of the information about the one or more alternative travel options is further performed in response to the received request.

27. The non-transitory computer-readable storage medium of claim 25 wherein the method further comprises, before the assessing of the multiple alternative travel options for the user:
receiving an indication of the starting location and the destination location; and
retrieving, by the configured computing device, at least some of the multiple alternative travel options in response to the received indication, the retrieved at least some alternative travel options having been previously determined for the user.

28. The non-transitory computer-readable storage medium of claim 25 wherein the assessing of the multiple alternative travel options for the user further includes assessing costs associated with using each of the multiple alternative travel options to travel from the starting location to the destination location at the indicated time, wherein the configured computing device is part of an inter-modal travel option assessment system, wherein the computer-readable storage medium is a memory of the configured computing device, and wherein the stored contents include software instructions that, when executed, program the configured computing device to perform the method.

29. A configured system, comprising:
one or more processors of one or more computing devices; and
one or more modules that are configured to, when executed by at least one of the one or more processors, assess travel options for one or more users by, for each of the one or more users:
determining one or more alternative travel options for the user to travel from a starting location to a destination location at an indicated time, wherein at least one of multiple modes of transportation involves private vehicles traveling on one or more roads and at least one of the multiple modes of transportation involves a mass transit system operating in a geographic area that includes the one or more roads, and wherein at least one of the alternative travel options uses the mass transit system;
obtaining information about traffic conditions on the one or more roads for the indicated time;
predicting differences between scheduled and actual arrival times corresponding to the indicated time at one or more transit embarkation locations for transit vehicles of the mass transit system;
assessing the one or more alternative travel options for the user based at least in part on the obtained information about the traffic conditions at the indicated time and on the predicted differences between the scheduled and actual arrival times at the one or more transit embarkation locations; and
providing information for the user about the one or more alternative travel options in a manner that reflects the assessing.

30. The system of claim 29 wherein, for one of the one or more users, the determining of the one or more alternative travel options for the one user includes determining multiple alternative travel options.

31. The system of claim 30 wherein the determined multiple alternative travel options for the one user include the at least one travel option for the one user and include at least one additional travel option for the one user that uses a combination of multiple modes of transportation including use of a private vehicle traveling on the one or more roads.

32. The system of claim 29 wherein, for one of the one or more users, the assessing of the one or more alternative travel options for the one user further includes assessing costs associated with using each of the one or more alternative travel options at each of multiple indicated times, wherein the multiple indicated times include a current time and include one or more future times, wherein the obtaining of the information about the traffic conditions includes obtaining actual traffic condition information for the current time and obtaining expected traffic condition information for each of the one or more future times by predicting at the current time the expected traffic condition information for each of the one or more future times, wherein the predicting of the differences between the scheduled and actual arrival times at the one or more transit embarkation locations is performed for each of the multiple indicated times, wherein the assessing of the costs for the current time includes using the obtained actual traffic condition information for the current time, and wherein the assessing of the costs for the one or more future times includes using the obtained expected traffic condition information for the one or more future times and using the predicted differences between the scheduled and actual arrival times at the one or more transit embarkation locations for each of the one or more future times.

33. The system of claim 29 wherein the one or more modules are part of an inter-modal travel option assessment system and include at least a travel option determiner module and a travel option assessor module, and wherein the one or more modules include software instructions for execution by the one or more processors.

34. The system of claim 29 wherein the one or more modules consist of one or more means for performing the assessing of the travel options for the one or more users.

35. A computer-implemented method comprising:
providing, by a configured computing device associated with a user, a request to an inter-modal travel option assessment system for assessment of one or more options for the user to travel from a starting location to a destination location in a geographic area using one or more of multiple available modes of transportation in the geographic area;
receiving, by the configured computing device and in response to the provided request, assessment information for one or more of multiple determined alternative travel options for the user to travel from the starting location to the destination location at one or more indicated times, wherein the multiple alternative travel options each use a distinct combination of one or more of the multiple available modes of transportation, wherein at least one of the multiple modes of transportation involves private vehicles traveling on one or more roads in the geographic area and at least one of the multiple modes of transportation involves a mass transit system operating in the geographic area, wherein the received assessment information indicates assessed costs for the one or more alternative travel options that are based at least in part on information about traffic conditions on the one or more roads at the one or more indicated times and on information about predicted differences between scheduled and actual arrival times corresponding to the one or more indicated times at one or more transit locations for transit vehicles of the mass transit system; and using, by the configured computing device, the received assessment information to enable the user to use one of the multiple determined alternative travel options to travel at one of the indicated times from the starting location to the destination location.

36. The method of claim 35 wherein the using of the received assessment information by the configured computing devices includes at least one of presenting routing information to the user for the one determined alternative travel option and of presenting at least some of the received assessment information to the user to enable selection by the user of the one determined alternative travel option.

37. The system of claim 29 wherein the indicated time is a future time, wherein the predicting of the differences between the scheduled and actual arrival times is performed at a current time that is before the future time, and wherein the obtaining of the information about the traffic conditions on the one or more roads for the indicated time is performed at the current time and includes predicting the traffic conditions at the future time on the one or more roads.

38. The system of claim 37 wherein the predicting of the differences between the scheduled and actual arrival times and the predicting of the traffic conditions at the future time are performed at least in part based on additional obtained information about actual traffic conditions at the current time.

39. The system of claim 29 wherein the indicated time is a current time, and wherein the predicting of the differences between the scheduled and actual arrival times is performed at least in part based on the obtained information about the traffic conditions at the indicated time.

40. The non-transitory computer-readable storage medium of claim 25 wherein the indicated time is a future time, wherein the predicting of the differences at the future time between the scheduled and actual arrival times is performed at a current time that is before the future time, and wherein the obtaining of the information about the traffic conditions on the one or more roads at the indicated time is performed at the current time and includes predicting the traffic conditions at the future time on the one or more roads.

41. The non-transitory computer-readable storage medium of claim 40 wherein the predicting of the differences at the future time between the scheduled and actual arrival times and the predicting of the traffic conditions at the future time are performed at least in part based on additional obtained information about actual traffic conditions at the current time.

42. The non-transitory computer-readable storage medium of claim 25 wherein the indicated time is a current time, and wherein the predicting of the differences between the scheduled and actual arrival times is performed at least in part based on the obtained information about the traffic conditions at the indicated time.

* * * * *